(12) United States Patent
Monna et al.

(10) Patent No.: US 10,167,043 B2
(45) Date of Patent: Jan. 1, 2019

(54) VEHICLE

(71) Applicant: YAMAHA HATSUDOKI KABUSHIKI KAISHA, Iwata-shi, Shizuoka (JP)

(72) Inventors: Takaaki Monna, Shizuoka (JP); Yosuke Hirayama, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 1 day.

(21) Appl. No.: 15/455,246

(22) Filed: Mar. 10, 2017

(65) Prior Publication Data

US 2017/0267309 A1 Sep. 21, 2017

(30) Foreign Application Priority Data

Mar. 18, 2016 (JP) .................. 2016-055800

(51) Int. Cl.
| | |
|---|---|
| *B62K 25/08* | (2006.01) |
| *B62K 5/027* | (2013.01) |
| *B62K 5/08* | (2006.01) |
| *B62K 5/10* | (2013.01) |
| *B62K 21/12* | (2006.01) |
| *B62K 21/26* | (2006.01) |
| *B62L 3/02* | (2006.01) |

(Continued)

(52) U.S. Cl.
CPC ............ *B62K 25/08* (2013.01); *B62K 5/027* (2013.01); *B62K 5/05* (2013.01); *B62K 5/08* (2013.01); *B62K 5/10* (2013.01); *B62K 21/12* (2013.01); *B62K 21/20* (2013.01); *B62K 21/26* (2013.01); *B62K 23/02* (2013.01); *B62L 3/02* (2013.01); *B62L 3/08* (2013.01); *B62K 2202/00* (2013.01)

(58) Field of Classification Search
CPC .......... B62K 25/08; B62K 5/027; B62K 5/08; B62K 5/10; B62K 21/12; B62K 21/26; B62K 2202/00
USPC ........................................... 280/267
See application file for complete search history.

(56) References Cited

U.S. PATENT DOCUMENTS

| | | | | |
|---|---|---|---|---|
| 5,209,506 A | * | 5/1993 | Klopfenstein | ........... B62K 5/08 280/240 |
| 6,817,617 B2 | * | 11/2004 | Hayashi | ................... B62K 5/05 280/124.1 |

(Continued)

FOREIGN PATENT DOCUMENTS

| | | |
|---|---|---|
| EP | 1 950 130 A1 | 7/2008 |
| EP | 2 703 270 A1 | 3/2014 |

(Continued)

*Primary Examiner* — Jacob D Knutson
(74) *Attorney, Agent, or Firm* — Keating and Bennett, LLP

(57) ABSTRACT

A vehicle includes a right front wheel, a left front wheel, a brake operator, grips, and a steering force transmission which transmits a steering force to the right front wheel and the left front wheel. The steering force transmission includes a steering shaft, a handlebar, and a tie rod. Brake operators, which operate the brakes, and the grips are located on the handlebar, and a rubber damper located on the steering force transmission significantly reduces or prevents vibrations from being transmitted to the grips, wherein the vibrations are due to a difference between a frictional force generated between the right front wheel and a corresponding road surface and a frictional force generated between the left front wheel and a corresponding road surface.

12 Claims, 14 Drawing Sheets

(51) Int. Cl.
*B62L 3/08* (2006.01)
*B62K 5/05* (2013.01)
*B62K 21/20* (2006.01)
*B62K 23/02* (2006.01)

(56) References Cited

U.S. PATENT DOCUMENTS

| | | | |
|---|---|---|---|
| 9,623,928 B2* | 4/2017 | Mori | B62K 5/10 |
| 9,855,807 B2* | 1/2018 | Mori | B60G 3/26 |
| 2005/0247160 A1 | 11/2005 | Ha et al. | |
| 2005/0253353 A1* | 11/2005 | Yamamura | B60G 3/20 |
| | | | 280/124.135 |
| 2013/0168944 A1* | 7/2013 | Bartolozzi | B60G 3/01 |
| | | | 280/269 |
| 2014/0060951 A1* | 3/2014 | Kashiwai | B62K 5/08 |
| | | | 180/210 |
| 2015/0069732 A1* | 3/2015 | Godlewski | B62K 9/02 |
| | | | 280/202 |
| 2015/0307149 A1 | 10/2015 | Iizuka et al. | |
| 2016/0280192 A1 | 9/2016 | Seto et al. | |

FOREIGN PATENT DOCUMENTS

| | | |
|---|---|---|
| EP | 2 899 109 A1 | 7/2015 |
| JP | 57-011178 A | 1/1982 |
| JP | 08-2468 A | 1/1996 |
| JP | 11-5579 A | 1/1999 |
| JP | 2007-137192 A | 6/2007 |
| JP | 2007-137193 A | 6/2007 |
| JP | 2015-110408 A | 6/2015 |
| WO | 2012/007819 A1 | 1/2012 |
| WO | 2014/098227 A1 | 6/2014 |

* cited by examiner

VEHICLE

CROSS REFERENCE TO RELATED APPLICATIONS

This application claims the benefit of priority to Japanese Patent Application No. 2016-055800 filed on Mar. 18, 2016. The entire contents of which are herein incorporated by reference.

BACKGROUND OF THE INVENTION

1. Field of the Invention

The present invention relates to a vehicle including a body frame that is able to lean and two front wheels.

2. Description of the Related Art

A vehicle is known and described in International Publication No. 2012/007819. This vehicle includes a right front wheel and a left front wheel, and a body frame that leans.

The vehicle includes a steering force transmission which controls steering angles of the right front wheel and the left front wheel by turning a handlebar. The steering force transmission includes the handlebar, a steering shaft and a tie rod. Grips are located at both ends of the handlebar. The handlebar is fixed to an upper portion of the steering shaft. The steering shaft is connected to the right front wheel and the left front wheel via the tie rod. The right front wheel and the left front wheel are connected together via the tie rod. When a rider turns the handlebar, the tie rod is displaced via the steering shaft, and the right front wheel and the left front wheel which are connected to the tie rod turn about a right turning axis and a left turning axis, respectively. This movement enables the rider to control the turning angles of the right front wheel and the left front wheel.

In a vehicle with a right front wheel and a left front wheel, since the right front wheel and the left front wheel pass over different road surfaces, a frictional force generated between the right front wheel and the corresponding road surface may differ from a frictional force generated between the left front wheel and the corresponding road surface. Since road surfaces on which the right front wheel and the left front wheel pass change moment by moment while the vehicle is traveling, the frictional forces acting on the right front wheel and the left front wheel also change moment by moment. When a frictional force generated between the right front wheel and the corresponding road surface differs from a frictional force generated between the left front wheel and the corresponding road surface, vibration is generated in a tie rod which is connected to the right front wheel and the left front wheel. This vibration is transmitted to grips via a steering shaft and a handlebar, which may cause a rider discomfort. Since the rider grips the grips when the brakes are applied, the vibration due to different behaviors of the right front wheel and the left front wheel when the brakes are applied tends to be transmitted to the rider.

SUMMARY OF THE INVENTION

Preferred embodiments of the present invention provide a vehicle that reduces or prevents the vibration due to different behaviors of the right front wheel and the left front wheel which is transmitted to a rider.

In a preferred embodiment of the present invention, a vehicle includes a body frame; a right front wheel and a left front wheel aligned side by side in a left-and-right direction of the body frame; a right brake that applies a brake force to the right front wheel; a left brake that applies a brake force to the left front wheel; a brake operator that operates at least one of the right brake and the left brake; a grip that a rider grips; and a steering force transmission that transmits a steering force from the grip to the right front wheel and the left front wheel, the steering force transmission including a steering shaft that turns about an intermediate turning axis which extends in an up-and-down direction of the body frame, a handlebar located at an upper portion of the steering shaft and the grip is located on at least one end of the handlebar, and a tie rod that transmits a turning motion of the steering shaft to the right front wheel and the left front wheel; wherein a rubber damper that suppresses the transmission of vibration, which is due to a difference between a frictional force that is generated between the right front wheel and a corresponding road surface and a frictional force that is generated between the left front wheel and a corresponding road surface, to the grip is provided in the steering force transmission mechanism.

In a preferred embodiment of the present invention, the rubber damper reduces or prevents the transmission of the vibration due to the difference between the frictional force generated between the right front wheel and the corresponding road surface and the frictional force generated between the left front wheel and the corresponding road surface to the grip. The rubber damper reduces or prevents the vibration transmitted to the rider gripping the grip when applying the brakes.

The vehicle includes a right shock absorber that supports the right front wheel at a lower portion of the right shock absorber such that the right front wheel is rotatable and is displaceable relative to an upper portion of the right shock absorber; and a left shock absorber that supports the left front wheel at a lower portion of the left shock absorber such that the left front wheel is rotatable and is displaceable relative to an upper portion of the left shock absorber.

Even though the right shock absorber and the left shock absorber are provided, the transmission of the vibration due to the difference between the friction force generated between the right front wheel and the corresponding road surface and the frictional force generated between the left front wheel and the corresponding road surface to the grip cannot be reduced effectively. A vibration force which attempts to displace the right front wheel and the left front wheel in a front-and-rear direction is dominant, and hence, the vibration cannot be reduced effectively by the right shock absorber and the left shock absorber which support the right front wheel and the left front wheel such that the right front wheel and the left front wheel are displaced in the up-and-down direction. Since the vibration displaces the right shock absorber together with the right front wheel and also displaces the left shock absorber together with the left front wheel, the magnitude of the displacement forces becomes large. In the event that the vibration forces are transmitted to the handlebar, the amplitude of the vibration is increased, leading to discomfort of the rider.

In a preferred embodiment of the present invention, however, the rubber damper significantly reduces or prevents the transmission of the vibration to the grip, and reduces or prevents the discomfort of the rider.

In a preferred embodiment of the invention, the vehicle includes a linkage that includes a cross member which is supported on the body frame, turns about a link axis that extends in a front-and-rear direction of the body frame, and supports the right front wheel and the left front wheel such that the right front wheel and the left front wheel are displaced relative to the body frame in the up-and-down direction of the body frame which causes the body frame to lean to the right of the vehicle when the vehicle turns right and to lean to the left of the vehicle when the vehicle turns left.

The vibration of the right front wheel and the left front wheel is transmitted via the linkage to the body frame, the handlebar which is supported on the body frame, and the grip which is located on the handlebar. The linkage includes a rigid member which does not significantly reduce the vibration transmitted therethrough. Thus, the vibration of the right front wheel and the left front wheel would be able to be transmitted to the grip. In addition, the cross member turns about the link axis which extends in the front-and-rear direction of the body frame and, thus, does not significantly reduce the vibration force of the right front wheel and the left front wheel in the front-and-rear direction.

In a preferred embodiment of the present invention, the vibration force of the right front wheel and the left front wheel in the front-and-rear direction that is transmitted to the grip is significantly reduced or prevented by the rubber damper.

In a preferred embodiment of the present invention, the linkage includes a right side member that turns about a right axis, which extends in the front-and-rear direction of the body frame at a right portion of the cross member, and that supports the right front wheel such that the right front wheel turns about a right turning axis, which extends in the up-and-down direction of the body frame; and a left side member that turns about a left axis, which is parallel or substantially parallel to the right axis at a left portion of the cross member, and that supports the left front wheel such that the left front wheel turns about a left turning axis, which is parallel or substantially parallel to the right turning axis.

In a preferred embodiment of the present invention, the vehicle includes a parallelogram linkage and has a reduced vehicle width. However, the handlebar may be far away from the right front wheel and the left front wheel in the up-and-down direction of the body frame. Accordingly, vibration generated in the right front wheel and the left front wheel would be amplified and transmitted to the grip of the handlebar.

In a preferred embodiment of the present invention, the vibration which is typically transmitted to the grip may be significantly reduced or prevented by the rubber damper.

In a preferred embodiment of the present invention, the steering force transmission includes a pitman arm that is fixed to the steering shaft at one end and that is connected to the tie rod at another end such that the pitman arm turns relative to the tie rod; and the rubber damper is located between the tie rod and the pitman arm such that a steering force applied to the grip is transmitted from the pitman arm to the tie rod via the rubber damper.

In a preferred embodiment of the present invention, the vibration is reduced near the right front wheel and the left front wheel which are sources of the vibration. Thus, it is possible to significantly reduce or prevent the vibration upstream of the tie rod along the steering force transmission path including the vibration in the pitman arm.

In a preferred embodiment of the present invention, the body frame includes a headpipe; the steering shaft is inserted in the headpipe; and the rubber damper is located between the headpipe and the steering shaft.

In a preferred embodiment of the present invention, the rubber damper is located in an interior of the headpipe, and there is no need to provide a space for the rubber damper. Thus, the design of the vehicle is facilitated since a layout of existing vehicles does not have to be significantly modified.

In a preferred embodiment of the present invention, the rubber damper is located between the handlebar and the steering shaft; and a steering force applied to the grip is transmitted from the handlebar to the steering shaft via the rubber damper.

In a preferred embodiment of the present invention, since the rubber damper is located near the handlebar, any vibration that is transmitted to the grip, including vibration which is transmitted from sources other than the right front wheel and the left front wheel, such as a rear wheel, for example, to the handlebar via the body frame, is significantly reduced or prevented.

In a preferred embodiment of the present invention, the rubber damper includes a metallic annular or tubular outer member; a metallic inner member that is located inside the outer member; and a rubber portion that is connected to the outer member and the inner member and that fills at least a portion of a space between the outer member and the inner member; wherein the inner member and the outer member are displaced relative to each other by elastic deformation of the rubber portion.

In a preferred embodiment of the present invention, the annular or tubular shape of the rubber damper includes a partially cut out annular shape or a tubular shape having a slit in an axial direction.

In a preferred embodiment of the present invention, the inner member and the outer member extend in the up-and-down direction of the body frame.

In a preferred embodiment of the present invention, the outer member and the inner member are displaced relative to each other in a front-and-rear direction of the body frame by elastic deformation of the rubber portion.

In a preferred embodiment of the present invention, the outer member and the inner member are displaced relative to each other in the front-and-rear direction of the body frame and in the left-and-right direction of the body frame by elastic deformation of the rubber portion.

In a preferred embodiment of the present invention, the right shock absorber supports the right front wheel such that the right front wheel is displaceable relative to an upper portion of the right shock absorber in a direction of a right extending and contracting axis that extends in the up-and-down direction of the body frame; the left shock absorber supports the left front wheel such that the left front wheel is displaceable relative to an upper portion of the left shock absorber in a direction of a left extending and contracting axis that is parallel or substantially parallel to the right extending and contracting axis; and the inner member and the outer member are displaced relative to each other about an axis that is parallel or substantially parallel to the right extending and contracting axis by elastic deformation of the rubber portion.

In a preferred embodiment of the present invention, since the rubber damper is displaced about the axis which is parallel or substantially parallel to the right extending and contracting axis and the left extending and contracting axis, the rubber damper reduces or prevents the vibration force in a direction in which the right shock absorber and the left shock absorber have difficulty absorbing vibration.

The above and other elements, features, steps, characteristics and advantages of the embodiments of the present invention will become more apparent from the following detailed description with reference to the attached drawings.

DETAILED DESCRIPTION OF THE PREFERRED EMBODIMENTS

Referring to FIGS. 1 to 9, a vehicle 1 according to a first preferred embodiment of the present invention will be described. The vehicle 1 includes a body frame which leans and two front wheels which are aligned side by side in a left-and-right direction of the body frame.

Figure 1:
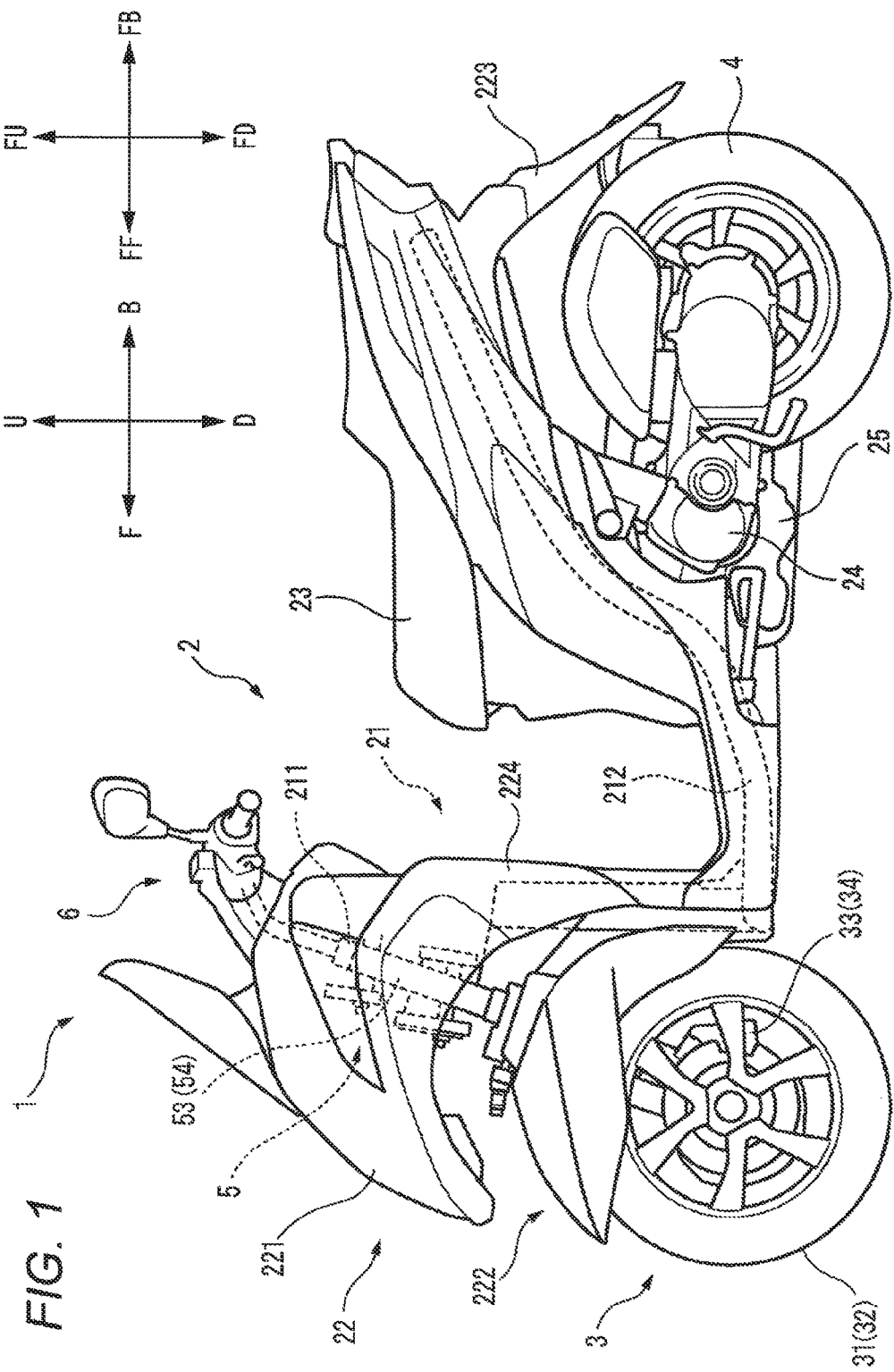
FIG. 1 is a left side view of a vehicle according to a first preferred embodiment of the present invention.

As shown in FIG. 1, the vehicle 1 includes a vehicle main body 2, two front wheels 3, a rear wheel 4, a linkage 5 and a steering force transmission 6.

The vehicle main body 2 includes a body frame 21, a body cover 22, a seat 23, a power source 24, and a rear arm 25.

In FIG. 1, the body frame 21 is in an upright state. The following description with reference to FIG. 1 is based on the premise that the body frame 21 is in the upright state. FIG. 1 is a left side view of the vehicle 1 in the left-and-right direction of the body frame 21.

The body frame 21 includes a headpipe 211 and a main frame 212.

The headpipe 211 is disposed at a front of the vehicle 1. When viewing the vehicle 1 from the left in the left-and-right direction of the body frame 21, an upper portion of the headpipe 211 is disposed behind a lower portion of the headpipe 211 in the front-and-rear direction of the body frame 21.

The main frame 212 is connected to the headpipe 211 and is disposed behind the headpipe 211 in the front-and-rear direction of the body frame 21. The main frame 212 supports the seat 23, the power source 24 and the rear arm 25.

The power source 24 preferably includes, for example, an engine, an electric motor, a battery or the like, and a transmission. Driving force generated by the power source is transmitted to the rear wheel 4 through the transmission.

The rear arm 25 extends in the front-and-rear direction of the body frame 21. A front end of the rear arm 25 is supported on the main frame 212 and is able to turn about an axis that extends in the left-and-right direction of the body frame 21. A rear end of the rear arm 25 supports the rear wheel 4.

The body cover 22 covers at least a portion of a group of elements that are included in the vehicle 1. The body cover 22 includes a front cover 221, two front mudguards 222, a rear mudguard 223 and a leg shield 224.

The front cover 221 is disposed ahead of the seat 23 in the front-and-rear direction of the body frame 21. The front cover 221 covers the linkage 5 and at least a portion of the steering force transmission 6. The front cover 221 is not displaced relative to the body frame 21.

At least portions of the individual front mudguards 222 are individually disposed directly below the front cover 221. At least portions of the individual front mudguards 222 are disposed above the individual front wheels 3.

The two front wheels 3 are disposed below the headpipe 211 in an up-and-down direction of the body frame 21. At least portions of the two front wheels 3 are disposed directly below the front cover 221 in the up-and-down direction of the body frame 21.

At least a portion of the rear wheel 4 is disposed below the seat 23 in the up-and-down direction of the body frame 21. At least a portion of the rear wheel 4 is disposed directly below the rear mudguard 223 in the up-and-down direction of the body frame 21.

The leg shield 224 is disposed behind the two front wheels 3 and ahead of the seat 23 in the front-and-rear direction of the body frame 21. The leg shield 224 is disposed in a position where the leg shield 224 covers at least portions of the legs of a rider sitting on the seat 23 when viewed from the front of the vehicle 1.

Figure 2:
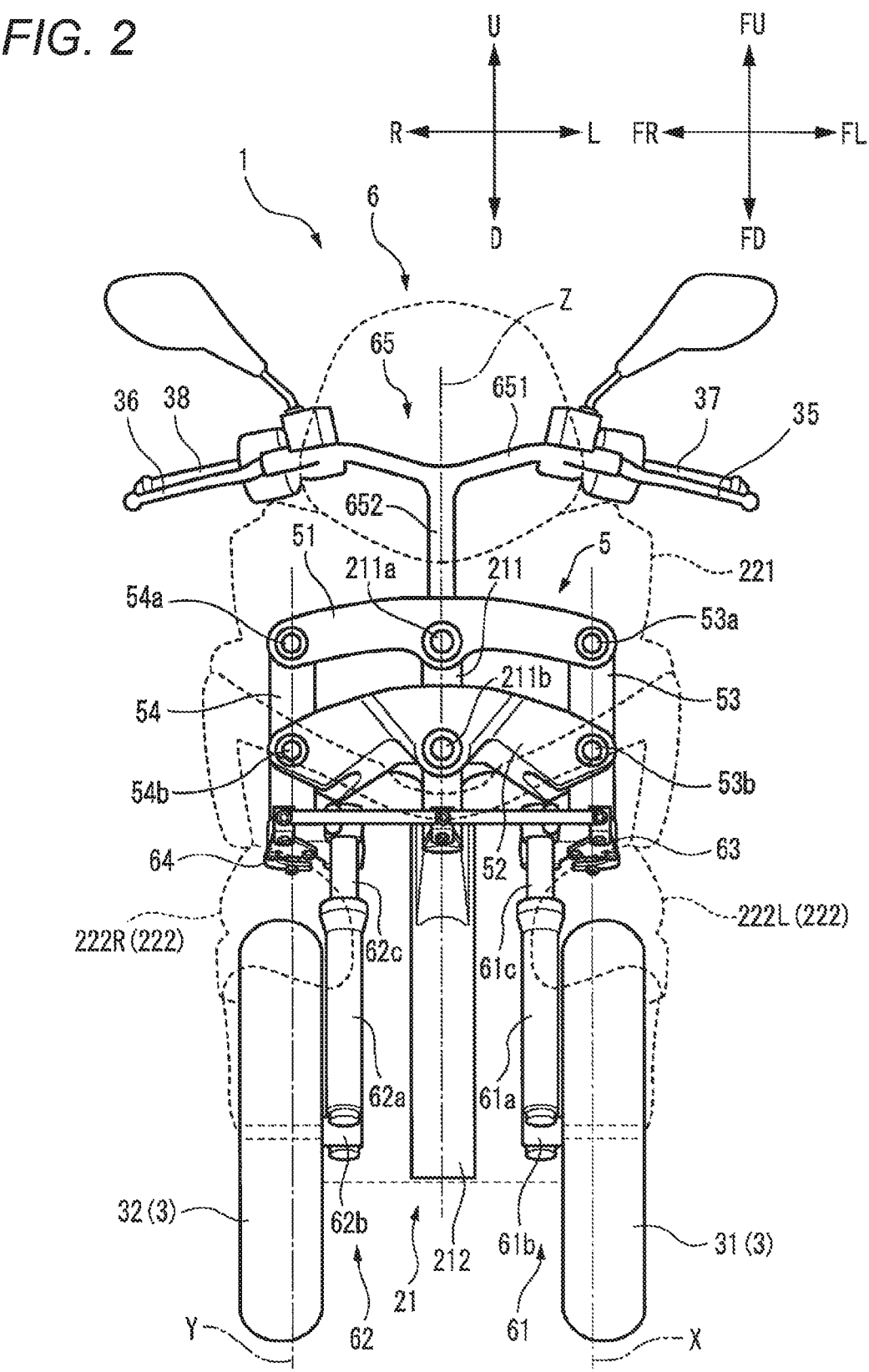
FIG. 2 is a front view showing a front portion of the vehicle shown in FIG. 1.

FIG. 2 is a front view of the front portion of the vehicle 1 in the front-and-rear direction of the body frame 21. In FIG. 2, the body frame 21 is in the upright state. The following description with reference to FIG. 2 is based on the premise that the body frame 21 is in the upright state. FIG. 2 shows a state in which those elements shown by solid lines are as seen through the front cover 221, the two front mudguards 222 and the leg shield 224 which are shown by dashed lines.

The two front wheels 3 include a left front wheel 31 and a right front wheel 32. The left front wheel 31 is disposed on the left of the headpipe 211, which is an element of the body frame 21, in the left-and-right direction of the body frame 21. The right front wheel 32 is disposed on the right of the headpipe 211 in the left-and-right direction of the body frame 21. The left front wheel 31 and the right front wheel 32 are aligned side by side in the left-and-right direction of the body frame 21.

The two front mudguards 222 include a left mudguard 222L and a right mudguard 222R. The left mudguard 222L covers at least a portion of an upper surface of the left front wheel 31. The right mudguard 222R covers at least a portion of an upper surface of the right front wheel 32.

The headpipe 211 supports a steering shaft 652 such that the steering shaft 652 is able to turn therein. The steering shaft 652 turns about an intermediate turning axis Z which extends in the up-and-down direction of the body frame 21. A handlebar 651 is fixed to an upper portion of the steering shaft 652.

The handlebar 651 extends in the left-and-right direction of the body frame 21. The rider steers the vehicle 1 by turning the handlebar 651 about the intermediate turning axis Z.

A left grip 37 and a left brake operator 35 are located at a left end of the handlebar 651. The rider grips the left grip 37 with his or her left hand. The left brake operator 35 is preferably located directly ahead of the left grip 37. A right end of the left brake operator 35 is supported on the handlebar 651 such that the left brake operator 35 is able to turn or pivot with respect to the handlebar 651. The rider operates the left brake operator 35 by gripping the left grip 37 and the left brake operator 35 with his or her left hand. When the rider operates the left brake operator 35, a rear brake applies a brake force to the rear wheel 4.

A right grip 38 and a right brake operator 36 are located at a right end of the handlebar 651. The rider grips the right grip 38 with his or her right hand. The right brake operator 36 is preferably located directly ahead of the right grip 38. A left end of the right brake operator 36 is supported on the handlebar 651 such that the right brake operator 36 is able to turn or pivot with respect to the handlebar 651. The rider operates the right brake operator 36 by gripping the right grip 38 and the right brake operator 36 with his or her right hand. When the rider operates the right brake operator 36, a left brake 33 applies a brake force to the left front wheel 31, and a right brake 34 applies a brake force to the right front wheel 32.

The steering force transmission 6 includes a left shock absorber 61, a right shock absorber 62, a left bracket 63 and a right bracket 64.

The left shock absorber 61 includes a left lower portion 61a. The left lower portion 61a supports the left front wheel 31. The left lower portion 61a extends along a left extending and contracting axis which extends in the up-and-down direction of the body frame 21. The left lower portion 61a includes a left support 61b at a lower end. The left front wheel 31 is supported on the left support 61b.

The left shock absorber 61 includes a left upper portion 61c. The left upper portion 61c extends along the left extending and contracting axis. The left upper portion 61c is preferably disposed directly above the left lower portion 61a in the up-and-down direction of the body frame 21 with a portion thereof inserted in the left lower portion 61a. An upper end of the left upper portion 61c is fixed to the left bracket 63. The left shock absorber 61 and the left bracket 63 are included in a left front wheel support.

The left shock absorber 61 is preferably a telescopic shock absorber. The left upper portion 61c moves relative to the left lower portion 61a along the left extending and contracting axis, such that the left shock absorber 61c extends and contracts along the left extending and contracting axis. This movement enables the left shock absorber 61 to absorb a displacement of the left front wheel 31 relative to the left upper portion 61c in the up-and-down direction of the body frame 21.

The right shock absorber 62 includes a right lower portion 62a. The right lower portion 62a supports the right front wheel 32. The right lower portion 62a extends along a right extending and contracting axis which extends in the up-and-down direction of the body frame 21. The right extending and contracting axis is parallel or substantially parallel to the left extending and contracting axis. The right lower portion 62a includes a right support 62b at a lower end. The right front wheel 32 is supported on the right support 62b.

The right shock absorber 62 includes a right upper portion 62c. The right upper portion 62c extends along the right extending and contracting axis. The right upper portion 62c is preferably disposed directly above the right lower portion 62a in the up-and-down direction of the body frame 21 with a portion thereof inserted in the right lower portion 62a. An upper end of the right upper portion 62c is fixed to the right bracket 64. The right shock absorber 62 and the right bracket 64 are included in a right front wheel support.

The right shock absorber 62 is preferably a telescopic shock absorber. The right upper portion 62c moves relative to the right lower portion 62a along the right extending and contracting axis, such that the right shock absorber 62 extends and contracts along the right extending and contracting axis. This movement enables the right shock absorber 62 to absorb a displacement of the right front wheel 32 relative to the right upper portion 62c in the up-and-down direction of the body frame 21.

The left brake 33 is located at a lower portion of the left shock absorber 61. The left brake 33 applies a brake force to the left front wheel 31.

The left brake 33 includes a left brake caliper and a left brake disc. The left brake caliper is fixed to the lower portion of the left shock absorber 61. The left brake disc is fixed to the left front wheel 31. The left brake disc rotates relative to the left brake caliper.

The left brake caliper applies a brake force to the left front wheel 31 by holding the left brake disc with a pair of brake pads therebetween. The left brake caliper operates in response to an operation of the right brake operator 36 located on the handlebar 651.

The right brake 34 is located at a lower portion of the right shock absorber 62. The right brake 34 applies a brake force to the right front wheel 32.

The right brake 34 includes a right brake caliper and a right brake disc. The right brake caliper is fixed to the lower portion of the right shock absorber 62. The right brake disc is fixed to the right front wheel 32. The right brake disc rotates relative to the right brake caliper.

The right brake caliper applies a brake force to the right front wheel 32 by holding the right brake disc with a pair of brake pads therebetween. The right brake caliper operates in response to the operation of the right brake operator 36 located on the handlebar 651.

In the vehicle 1 according to the present preferred embodiment, the linkage 5 includes a four parallel, or substantially parallel, joint linkage (also referred to as a parallelogram link).

The linkage 5 is disposed below the handlebar 651 in the up-and-down direction of the body frame 21. The linkage 5 is disposed above the left front wheel 31 and the right front wheel 32 in the up-and-down direction of the body frame 21. The linkage 5 includes an upper cross member 51, a lower cross member 52, a left side member 53 and a right side member 54. The linkage 5 is not interlocked with the turning of the steering shaft 652 about the intermediate steering axis Z which turns with an operation of the handlebar 651. For example, the linkage 5 does not turn about the intermediate steering axis Z relative to the body frame 21.

The headpipe 211 includes an upper intermediate connector 211a. An intermediate portion of the upper cross member 51 is connected to the headpipe 211 by the upper intermediate connector 211a. The upper cross member 51 is able to turn relative to the headpipe 211 about an upper intermediate connecting axis which passes through the upper intermediate connector 211a to extend in the front-and-rear direction of the body frame 21.

The left side member 53 includes an upper left connector 53a. A left end of the upper cross member 51 is connected to the left side member 53 by the upper left connector 53a. The upper cross member 51 is able to turn relative to the left side member 53 about an upper left connecting axis which passes through the upper left connector 53a to extend in the front-and-rear direction of the body frame 21.

The right side member 54 includes an upper right connector 54a. A right end of the upper cross member 51 is connected to the right side member 54 by the upper right connector 54a. The upper cross member 51 is able to turn relative to the right side member 54 about an upper right connecting axis which passes through the upper right connector 54a to extend in the front-and-rear direction of the body frame 21.

The headpipe 211 includes a lower intermediate connector 211b. An intermediate portion of the lower cross member 52 is connected to the headpipe 211 by the lower intermediate connector 211b. The lower cross member 52 is able to turn relative to the headpipe 211 about a lower intermediate connecting axis which passes through the lower intermediate connector 211b to extend in the front-and-rear direction of the body frame 21.

The left side member 53 includes a lower left connector 53b. A left end of the lower cross member 52 is connected to the left side member 53 by the lower left connector 53b. The lower cross member 52 is able to turn relative to the left side member 53 about a lower left connecting axis which passes through the lower left connector 53b to extend in the front-and-rear direction of the body frame 21.

The right side member 54 includes a lower right connector 54b. A right end of the lower cross member 52 is connected to the right side member 54 by the lower right connector 54b. The lower cross member 52 is able to turn relative to the right side member 54 about a lower right connecting axis which passes through the lower right connector 54b to extend in the front-and-rear direction of the body frame 21.

The upper intermediate connecting axis, the upper right connecting axis, the upper left connecting axis, the lower intermediate connecting axis, the lower right connecting axis and the lower left connecting axis extend parallel or substantially parallel to one another. The upper intermediate connecting axis, the upper right connecting axis, the upper left connecting axis, the lower intermediate connecting axis, the lower right connecting axis and the lower left connecting axis are disposed above the left front wheel 31 and the right front wheel 32 in the up-and-down direction of the body frame 21.

Figure 5:
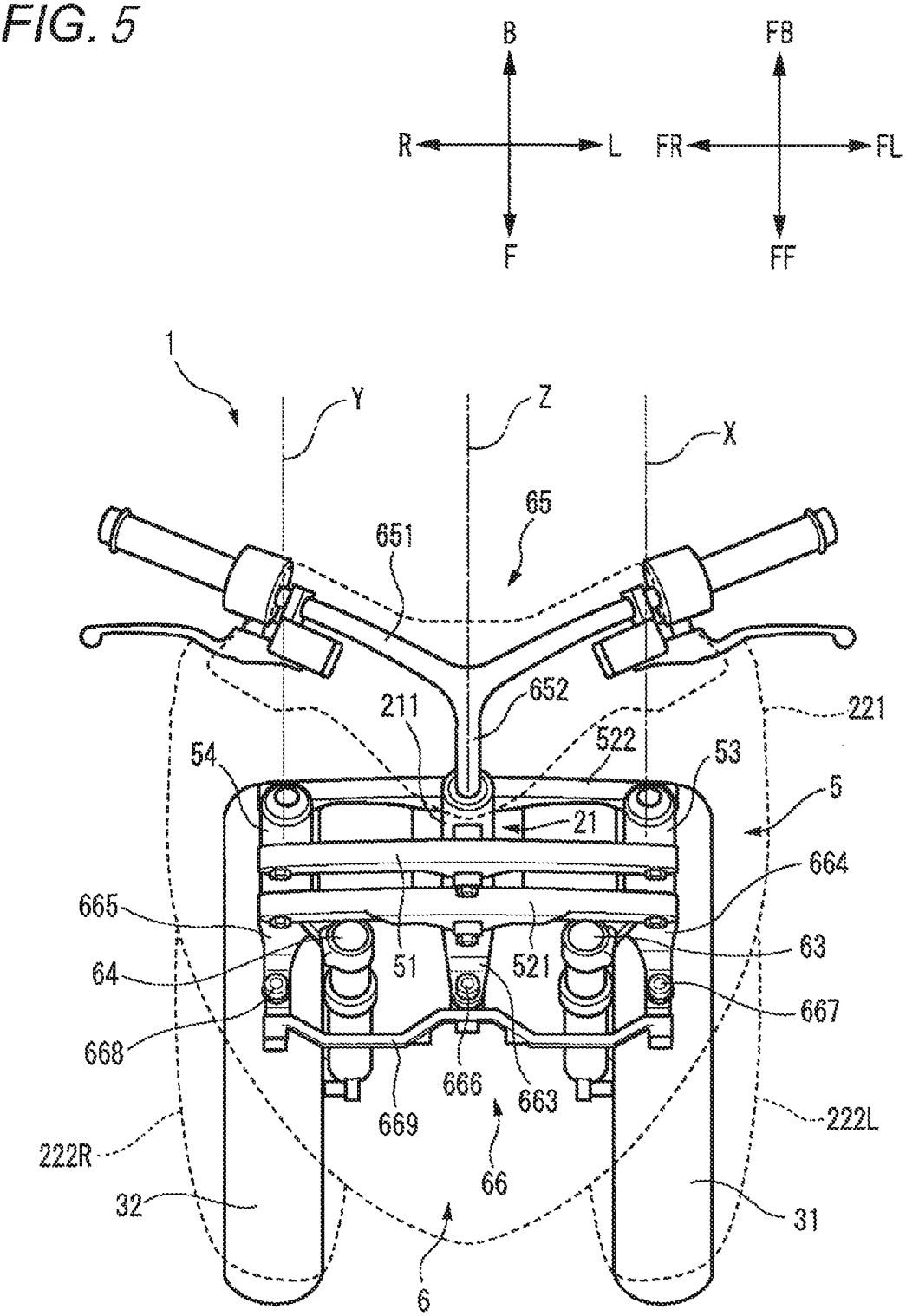
FIG. 5 is a plan view showing the front portion of the vehicle shown in FIG. 1.

FIG. 5 is a plan view of the front portion of the vehicle 1 as viewed from above in the up-and-down direction of the body frame 21. In FIG. 5, the body frame 21 is in the upright state. The following description with reference to FIG. 5 is based on the premise that the body frame 21 is in the upright state. FIG. 5 shows a state which is seen through the front cover 221, the left mudguard 222L and the right mudguard 222R which are shown by dashed lines.

The upper cross member 51 is disposed ahead of the headpipe 211 in the front-and-rear direction of the body frame 21. The upper cross member 51 extends in the left-and-right direction of the body frame 21.

The lower cross member 52 includes a front element 521 and a rear element 522. The front element 521 is disposed ahead of the headpipe 211 in the front-and-rear direction of the body frame 21. The rear element 522 is disposed behind the headpipe 211 in the front-and-rear direction of the body frame 21. The front element 521 and the rear element 522 extend in the left-and-right direction of the body frame 21.

The lower cross member 52 is disposed below the upper cross member 51 in the up-and-down direction of the body frame 21.

The steering force transmission 6 includes the handlebar 651 and the steering shaft 652. The handlebar 651 is attached to an upper portion of the steering shaft 652. A portion of the steering shaft 652 is supported by the headpipe 211 such that the headpipe is able to turn therein. The intermediate turning axis Z of the steering shaft 652 extends in the up-and-down direction of the body frame 21. As shown in FIG. 1, the upper portion of the steering shaft 652 is disposed behind a lower portion thereof in the front-and-rear direction of the body frame 21. Accordingly, the intermediate turning axis Z of the steering shaft 652 is inclined in the front-and-rear direction of the body frame 21. The steering shaft 652 turns about the intermediate turning axis Z in response to the operation of the handlebar 651 by the rider.

As shown in FIGS. 2 and 5, the left side member 53 is disposed directly on the left of the headpipe 211 in the left-and-right direction of the body frame 21. The left side member 53 is disposed above the left front wheel 31 in the up-and-down direction of the body frame 21. The left side member 53 extends in a direction in which the headpipe 211 extends. The left side member 53 extends in a direction in which the intermediate turning axis Z of the steering shaft 652 extends. An upper portion of the left side member 53 is disposed behind a lower portion thereof in the front-and-rear direction of the body frame 21.

The left bracket 63 includes a left turning member at an upper portion thereof. The left turning member is disposed in an interior of the left side member 53 and extends in the same direction as the direction in which the left side member 53 extends. The left turning member turns about a left turning axis X relative to the left side member 53. For example, the left bracket 63 turns about the left turning axis X relative to the left side member 53. The left turning axis X extends in the direction in which the left side member 53 extends. As shown in FIG. 2, the left steering axis X extends parallel or substantially parallel to the intermediate turning axis Z of the steering shaft 652 in the up-and-down direction of the body frame 21. As shown in FIG. 5, the left turning axis X extends parallel or substantially parallel to the intermediate turning axis Z of the steering shaft 652 in the front-and-rear direction of the body frame 21.

As shown in FIGS. 2 and 5, the right side member 54 is preferably disposed directly on the right of the headpipe 211 in the left-and-right direction of the body frame 21. The right side member 54 is disposed above the right front wheel 32 in the up-and-down direction of the body frame 21. The right side member 54 extends in the direction in which the headpipe 211 extends. The right side member 54 extends in the direction in which the intermediate turning axis Z of the steering shaft 652 extends. An upper portion of the right side member 54 is disposed behind a lower portion thereof in the front-and-rear direction of the body frame 21.

The right bracket 64 includes a right turning member at an upper portion thereof. The right turning member is disposed in an interior of the right side member 54 and extends in the same direction as the direction in which the right side member 54 extends. The right turning member turns about a right turning axis Y relative to the right side member 54. For example, the right bracket 64 turns about the right turning axis Y relative to the right side member 54. The right turning axis Y extends in the direction in which the right side member 54 extends. As shown in FIG. 2, the right turning axis Y extends parallel or substantially parallel to the intermediate turning axis Z of the steering shaft 652 in the up-and-down direction of the body frame 21. As shown in FIG. 5, the right turning axis Y extends parallel or substantially parallel to the intermediate turning axis Z of the steering shaft 652 in the front-and-rear direction of the body frame 21.

Thus, the upper cross member 51, the lower cross member 52, the left side member 53 and the right side member 54 are supported on the body frame 21 so that the upper cross member 51 and the lower cross member 52 are held in postures which are parallel or substantially parallel to each other and so that the left side member 53 and the right side member 54 are held in postures which are parallel or substantially parallel to each other.

Figure 3:
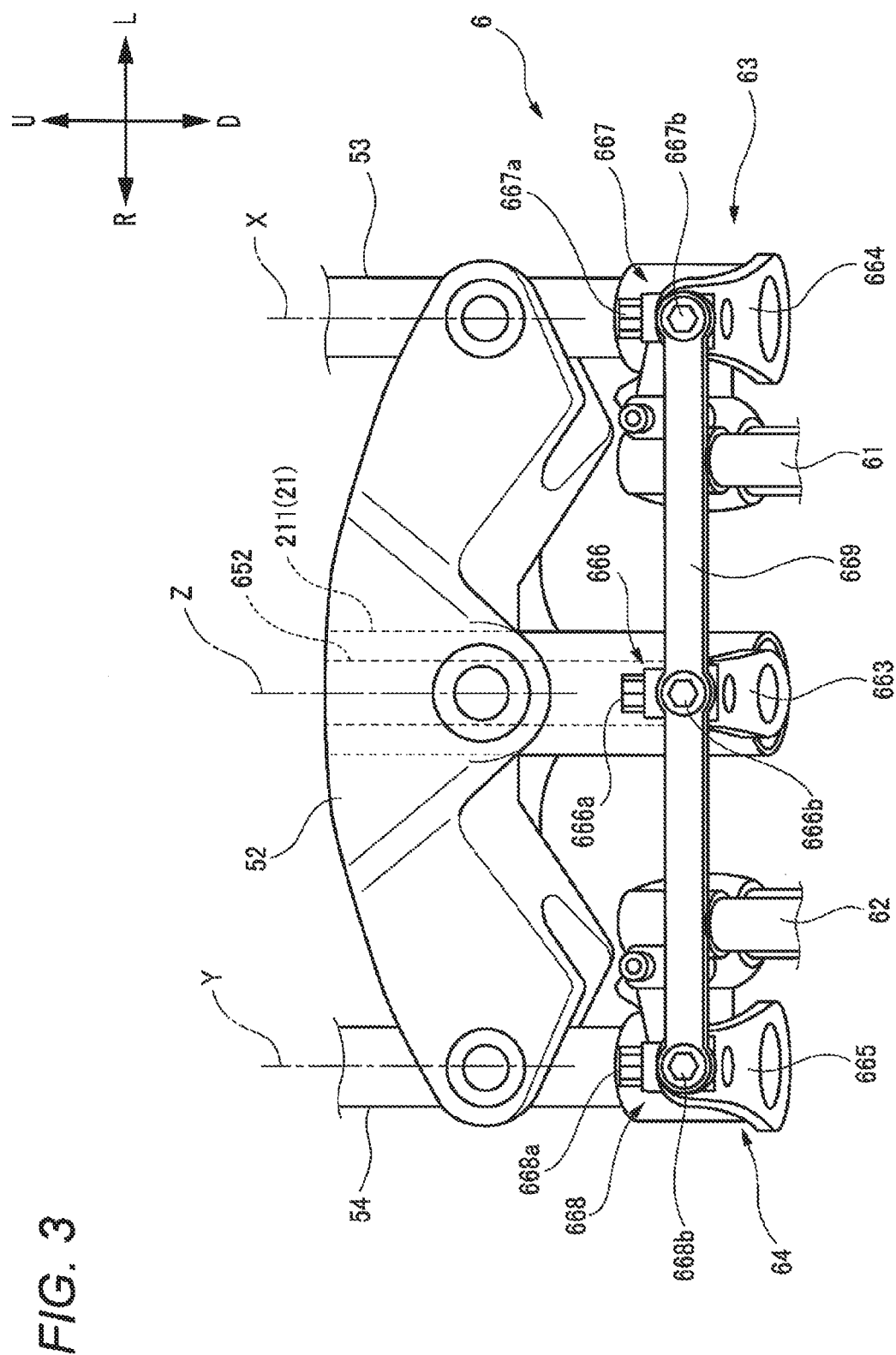
FIG. 3 is a front view of a lower portion of a steering shaft.
Figure 4:
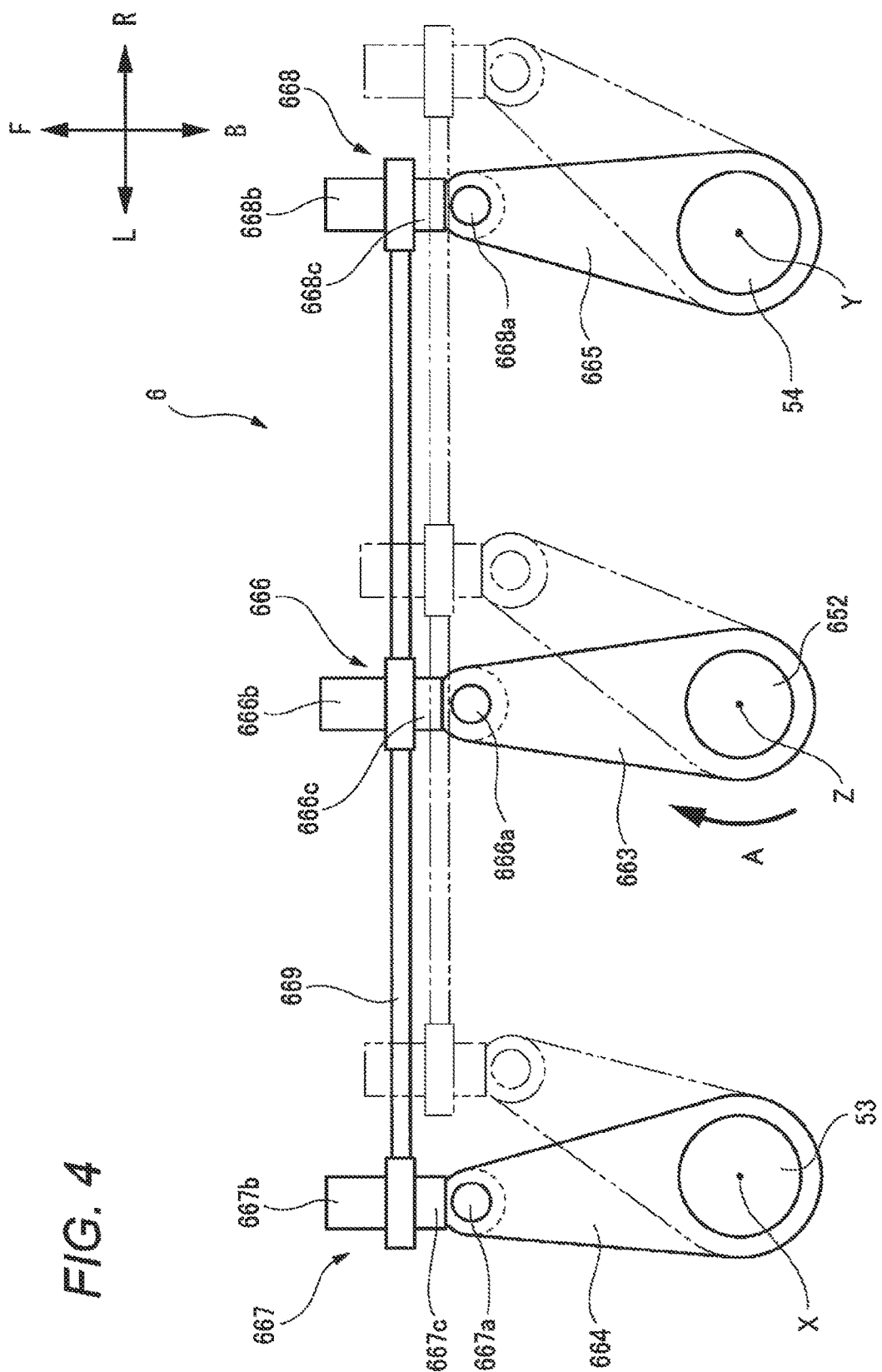
FIG. 4 is a schematic plan view showing a steering force transmission.

FIG. 3 is a front view of a lower portion of the steering shaft 652. FIG. 3 shows the steering force transmission 6 in an enlarged manner. FIG. 4 is a schematic plan view showing the configuration of the steering force transmission 6. FIG. 4 shows the steering force transmission 6 as seen from above with the configurations of the linkage 5, the left bracket 63 and the right bracket 64 omitted. Dashed chain lines indicate a state in which the steering shaft 652 is turned in a direction indicated by an arrow A in FIG. 4.

The steering force transmission 6 transmits a steering force with which the rider operates the handlebar 651 to the left bracket 63 and the right bracket 64. The left bracket 63 turns about the left turning axis X together with the left front wheel 31. The right bracket 64 turns about the right turning axis Y together with the right front wheel 32.

As shown in FIG. 3, the steering force transmission 6 includes a pitman arm 663, a left transmission plate 664, a right transmission plate 665, an intermediate joint 666, a left joint 667, a right joint 668, and a tie rod 669.

The pitman arm 663 is connected to the lower portion of the steering shaft 652. The pitman arm 663 turns together with the steering shaft 652. The pitman arm 663 turns about the intermediate turning axis Z.

The left transmission plate 664 is preferably disposed directly on the left of the pitman arm 663. The left transmission plate 664 is connected to a lower portion of the left bracket 63. The left transmission plate 664 cannot turn relative to the left bracket 63. The left transmission plate 664 turns about the left turning axis X relative to the left side member 53.

The right transmission plate 665 is preferably disposed directly on the right of the pitman arm 663. The right transmission plate 665 is connected to a lower portion of the right bracket 64. The right transmission plate 665 cannot turn relative to the right bracket 64. The right transmission plate 665 turns about the right turning axis Y relative to the right side member 54.

The tie rod 669 is located ahead of the steering shaft 652, the left side member 53 and the right side member 54. A left portion of the tie rod 669 is connected to the left transmission plate 664 via the left joint 667. A right portion of the tie rod 669 is connected to the right transmission plate 665 via the right joint 668. A central portion of the tie rod 669 is connected to the pitman arm 663 via the intermediate joint 666.

As shown in FIG. 4, the left joint 667 is located at a front portion of the left transmission plate 664. The left joint 667 includes a left rear bearing 667a, a left front bearing 667b, and a left connector 667c which connects the left front bearing 667b and the left rear bearing 667a together.

The left rear bearing 667a connects the left connector 667c and the left transmission plate 664 together such that the left connector 667c turns relative to the left transmission plate 664 about an axis which extends parallel or substantially parallel to the left turning axis X.

The left front bearing 667b is located ahead of the left rear bearing 667a. The left front bearing 667b connects the left connector 667c and the tie rod 669 together such that the left connector 667c turns relative to the tie rod 669 about an axis which intersects an axis of the left rear bearing 667a at or substantially at right angles and extends in the front-and-rear direction of the body frame 21.

The left joint 667 connects the tie rod 669 and the left transmission plate 664 together such that the tie rod 669 and the left transmission plate 664 turn about an axis which extends in the up-and-down direction of the body frame 21 and an axis which extends in the front-and-rear direction of the body frame 21.

The right joint 668 is located at a front portion of the right transmission plate 665. The right joint 668 includes a right rear bearing 668a, a right front bearing 668b, and a right connector 668c which connects the right rear bearing 668a and the right front bearing 668b together.

The right rear bearing 668a connects the right connector 668c and the right transmission plate 665 together such that the right connector 668c turns relative to the right transmission plate 665 about an axis which extends parallel or substantially parallel to the right turning axis Y.

The right front bearing 668b is located ahead of the right rear bearing 668a. The right front bearing 668b connects the right connector 668c and the tie rod 669 together such that the right connector 668c turns relative to the tie rod 669 about an axis which intersects an axis of the right rear bearing 668a at or substantially at right angles and extends in the front-and-rear direction of the body frame 21.

The right joint 668 connects the tie rod 669 and the right transmission plate 665 together such that the tie rod 669 and the right transmission plate 665 turn about an axis which extends in the up-and-down direction of the body frame 21 and an axis which extends in the front-and-rear direction of the body frame 21.

The intermediate joint 666 includes an intermediate rear bearing 666a, an intermediate front bearing 666b and an intermediate connector 666c which connects the intermediate rear bearing 666a and the intermediate front bearing 666b together.

The intermediate rear bearing 666a connects the intermediate connector 666c and the pitman arm 663 together such that the intermediate connector 666c turns relative to the pitman arm 663 about an axis which extends parallel or substantially parallel to the intermediate turning axis Z.

The intermediate front bearing 666b is located ahead of the intermediate rear bearing 666a. The intermediate front bearing 666b connects the intermediate connector 666c and the tie rod 669 together such that the intermediate connector 666c turns relative to the tie rod 669 about an axis which intersects the intermediate rear bearing 666a at or substantially at right angles and extends in the front-and-rear direction of the body frame 21.

The intermediate joint 666 connects the tie rod 669 and the pitman arm 663 together such that the tie rod 669 and the pitman arm 663 turn about an axis which extends in the up-and-down direction of the body frame 21 and an axis which extends in the front-and-rear direction of the body frame 21.

Figure 6:
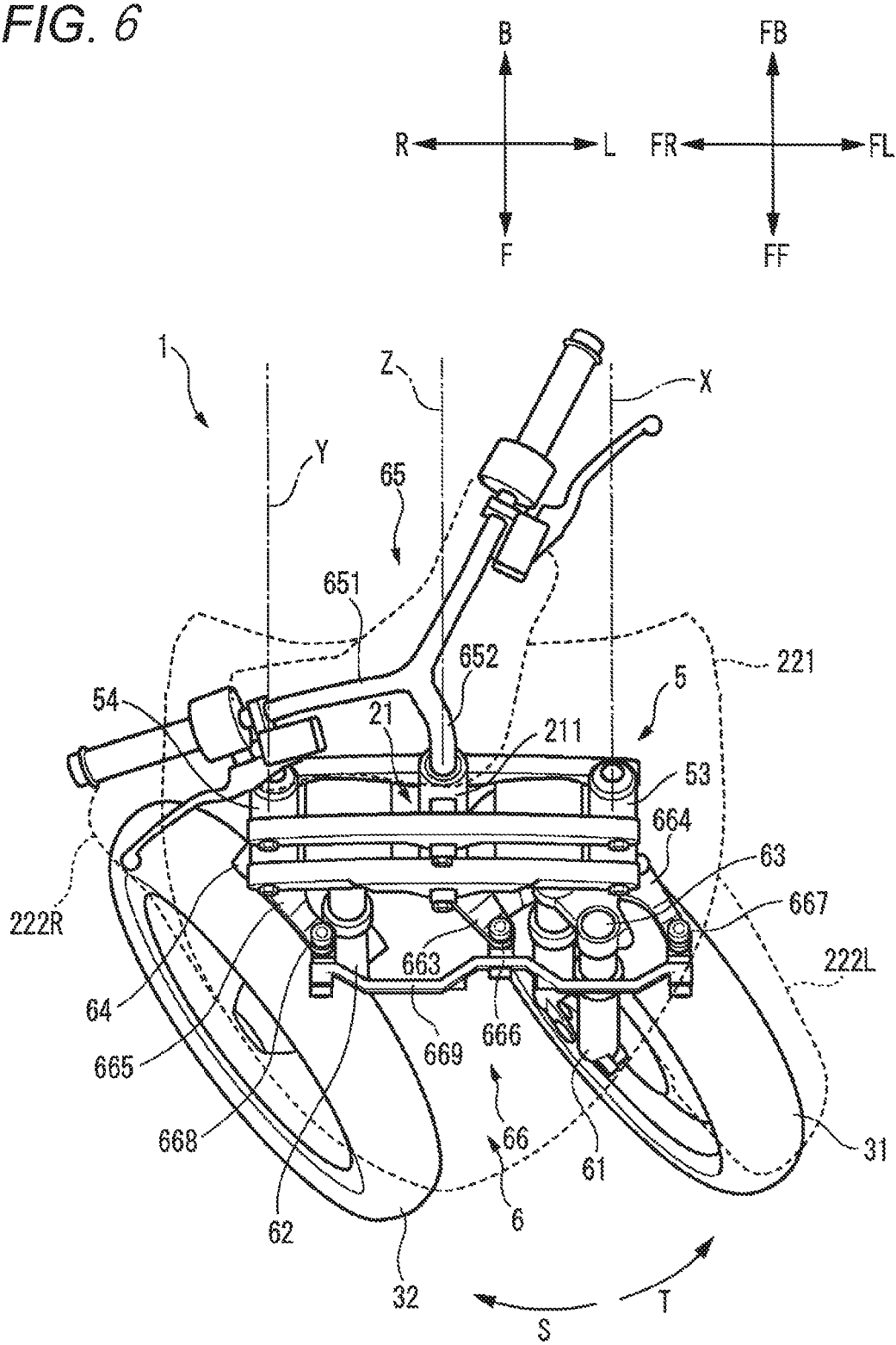
FIG. 6 is a plan view showing the front portion of the vehicle shown in FIG. 1 when the vehicle is steered.

Referring to FIGS. 5 and 6, a steering operation of the vehicle 1 will be described. FIG. 6 is a plan view of the front portion of the vehicle 1 as viewed from above in the up-and-down direction of the body frame 21 with the left front wheel 31 and the right front wheel 32 turned to the left.

In FIG. 6, the body frame 21 is in the upright state. The following description with reference to FIG. 6 is based on the premise that the body frame 21 is in the upright state. FIG. 6 shows a state which is seen through the front cover 221, the left mudguard 222L and the right mudguard 222R which are shown by dashed lines.

When the rider operates the handlebar 651, the steering shaft 652 turns about the intermediate turning axis Z relative to the headpipe 211. In an example with the front wheels being turned to the left as shown in FIG. 6, the steering shaft 652 turns in a direction indicated by an arrow T. The pitman arm 663 turns in the direction of the arrow T relative to the headpipe 211 about the intermediate steering axis Z.

The intermediate joint 666 of the tie rod 669 turns relative to the pitman arm 663 in a direction indicated by an arrow S. This turning causes the tie rod 669 to move to the left in the left-and-right direction of the body frame 21 and to the rear in the front-and-rear direction of the body frame 21 while maintaining its posture.

The left joint 667 and the right joint 668 of the tie rod 669 turn in the direction of the arrow S relative to the left transmission plate 664 and the right transmission plate 665, respectively. This movement turns the left transmission plate 664 and the right transmission plate 665 in the direction of the arrow T while allowing the tie rod 669 to maintain its posture.

When the left transmission plate 664 turns in the direction of the arrow T, the left bracket 63, which is not able to turn relative to the left transmission plate 664, turns in the direction of the arrow T about the left turning axis X relative to the left side member 53.

When the right transmission plate 665 turns in the direction of the arrow T, the right bracket 64, which is not able to turn relative to the right transmission plate 665, turns in the direction of the arrow T about the right turning axis Y relative to the right side member 54.

When the left bracket 63 turns in the direction of the arrow T, the left shock absorber 61, which is supported on the left bracket 63, turns in the direction of the arrow T about the left turning axis X relative to the left side member 53. When the left shock absorber 61 turns in the direction of the arrow T, the left front wheel 31, which is supported on the left shock absorber 61 by the left support 61b, turns in the direction of the arrow T about the left turning axis X relative to the left side member 53. The left mudguard 222L also turns in the direction of the arrow T together with the left front wheel 31.

When the right bracket 64 turns in the direction of the arrow T, the right shock absorber 62, which is supported on the right bracket 64, turns in the direction of the arrow T about the right turning axis Y relative to the right side member 54. When the right shock absorber 62 turns in the direction of the arrow T, the right front wheel 32, which is supported on the right shock absorber 62 by the right support 62b, turns in the direction of the arrow T about the right turning axis Y relative to the right side member 54. The right mudguard 222R also turns in the direction of the arrow T together with right front wheel 32.

When the rider turns the handlebar 651 to the right, the elements described above turn in opposite directions to the directions in which they turn when the handlebar 651 is turned to the left. Accordingly, a detailed description thereof will be omitted.

Figure 7:
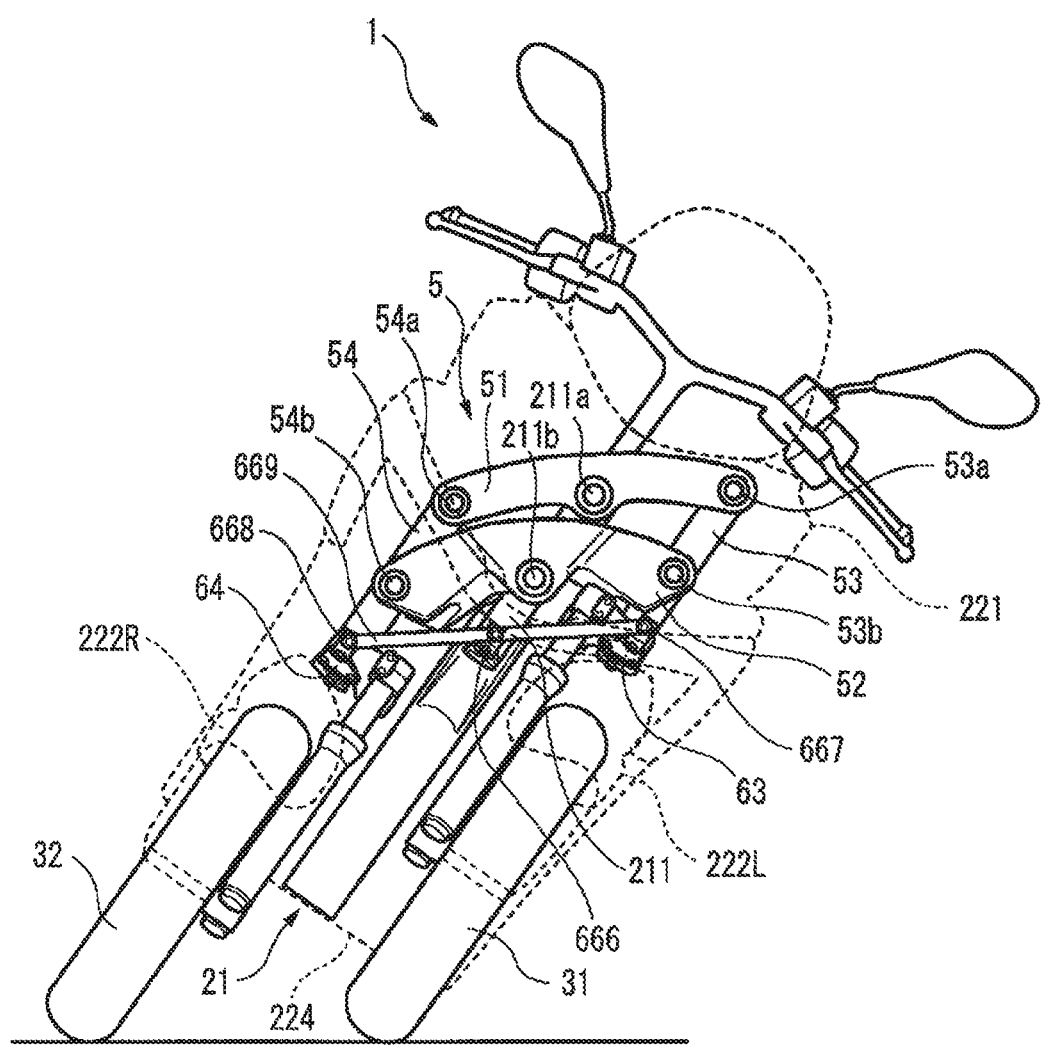
FIG. 7 is a front view showing the front portion of the vehicle shown in FIG. 1 when the vehicle leans to the left.

Referring to FIGS. 2 and 7, a leaning operation of the vehicle 1 will be described. FIG. 7 is a front view of the front portion of the vehicle 1 in the front-and-rear direction of the body frame 21 with the body frame 21 leaning to the left of the vehicle 1. FIG. 7 shows a state which is seen through the front cover 221, the left mudguard 222L, the right mudguard 222R and the leg shield 224 which are shown by dashed lines.

As shown in FIG. 2, when the vehicle 1 is seen from the front of the body frame 21 with the body frame 21 resting in the upright state, the linkage 5 has a rectangular or substantially rectangular shape. As shown in FIG. 7, when the vehicle 1 is seen from the front of the body frame 21 with the body frame 21 leaning, the linkage 5 has a parallelogram shape. An operation of the linkage 5 is interlocked with the leaning of the body frame 21 in the left-and-right direction. The operation of the linkage 5 means that the upper cross member 51, the lower cross member 52, the left side member 53 and the right side member 54 which are included in the linkage 5 turn relative to one another about the turning axes which pass through the upper intermediate connector 211a, the upper left connector 53a, the upper right connector 54a, the lower intermediate connector 211b, the lower left connector 53b and the lower right connector 54b such that the shape of the linkage 5 changes.

For example, as shown in FIG. 7, when the rider causes the vehicle 1 to lean to the left, the headpipe 211 leans to the left from the vertical direction. When the headpipe 211 leans, the upper cross member 51 turns counterclockwise about the upper intermediate connecting axis which passes through the upper intermediate connector 211a relative to the headpipe 211 when seen from the front of the vehicle 1. Similarly, the lower cross member 52 turns counterclockwise about the lower intermediate connecting axis which passes through the lower intermediate connector 211b relative to the headpipe 211 when seen from the front of the vehicle 1. This turning causes the upper cross member 51 to move to the left in the left-and-right direction of the body frame 21 relative to the lower cross member 52.

Accordingly, the upper cross member 51 turns counterclockwise about the upper left connecting axis which passes through the upper left connector 53a and the upper right connecting axis which passes through the upper right connector 54a relative to the left side member 53 and the right side member 54, respectively, when seen from the front of the vehicle 1. Similarly, the lower cross member 52 turns counterclockwise about the lower left connecting axis which passes through the lower left connector 53b and the lower right connecting axis which passes through the lower right connector 54b relative to the left side member 53 and the right side member 54, respectively, when seen from the front of the vehicle 1. This movement causes the left side member 53 and the right side member 54 to lean to the left of the vehicle 1 from the vertical direction while holding their postures parallel or substantially parallel to the headpipe 211.

The lower cross member 52 moves to the left in the left-and-right direction of the body frame 21 relative to the tie rod 669. Accordingly, shafts that are located at the respective front portions of the intermediate joint 666, the left joint 667 and the right joint 668 turn relative to the tie rod 669. This turning allows the tie rod 669 to hold a posture that is parallel or substantially parallel to the upper cross member 51 and the lower cross member 52.

As the left side member 53 leans to the left of the vehicle 1, the left bracket 63 which is supported on the left side member 53 by the left turning member leans to the left of the vehicle 1. The left shock absorber 61 that is supported on the left bracket 63 also leans to the left of the vehicle 1. Accordingly, the left front wheel 31 which is supported on the left shock absorber 61 leans to the left of the vehicle 1 while holding its posture which is parallel or substantially parallel to the headpipe 211.

As the right side member 54 leans to the left of the vehicle 1, the right bracket 64 which is supported on the right side member 54 by the right turning member leans to the left of the vehicle 1. The right shock absorber 62 which is supported on the right bracket 64 also leans to the left of the vehicle 1. Accordingly, the right front wheel 32 which is supported on the right shock absorber 62 leans to the left of the vehicle 1 while holding its posture which is parallel or substantially parallel to the headpipe 211.

The descriptions of the leaning operations of the left front wheel 31 and the right front wheel 32 are made in reference to the vertical direction. However, when the vehicle 1 is operated to lean (when the linkage 5 is activated), the up-and-down direction of the body frame 21 does not coincide with the vertical direction. In an example where the up-and-down direction of the body frame 21 is set as a reference, when the linkage 5 is activated, the left front wheel 31 and the right front wheel 32 change their relative position in the up-and-down direction of the body frame 21. For example, the linkage 5 changes the relative position of the left front wheel 31 and the right front wheel 32 in the up-and-down direction of the body frame 21 to cause the body frame 21 to lean to the left or right of the vehicle 1 from the vertical direction.

When the rider causes the vehicle 1 to lean to the right, the elements described above lean to the right. Accordingly, a detailed description thereof will be omitted.

Figure 8:
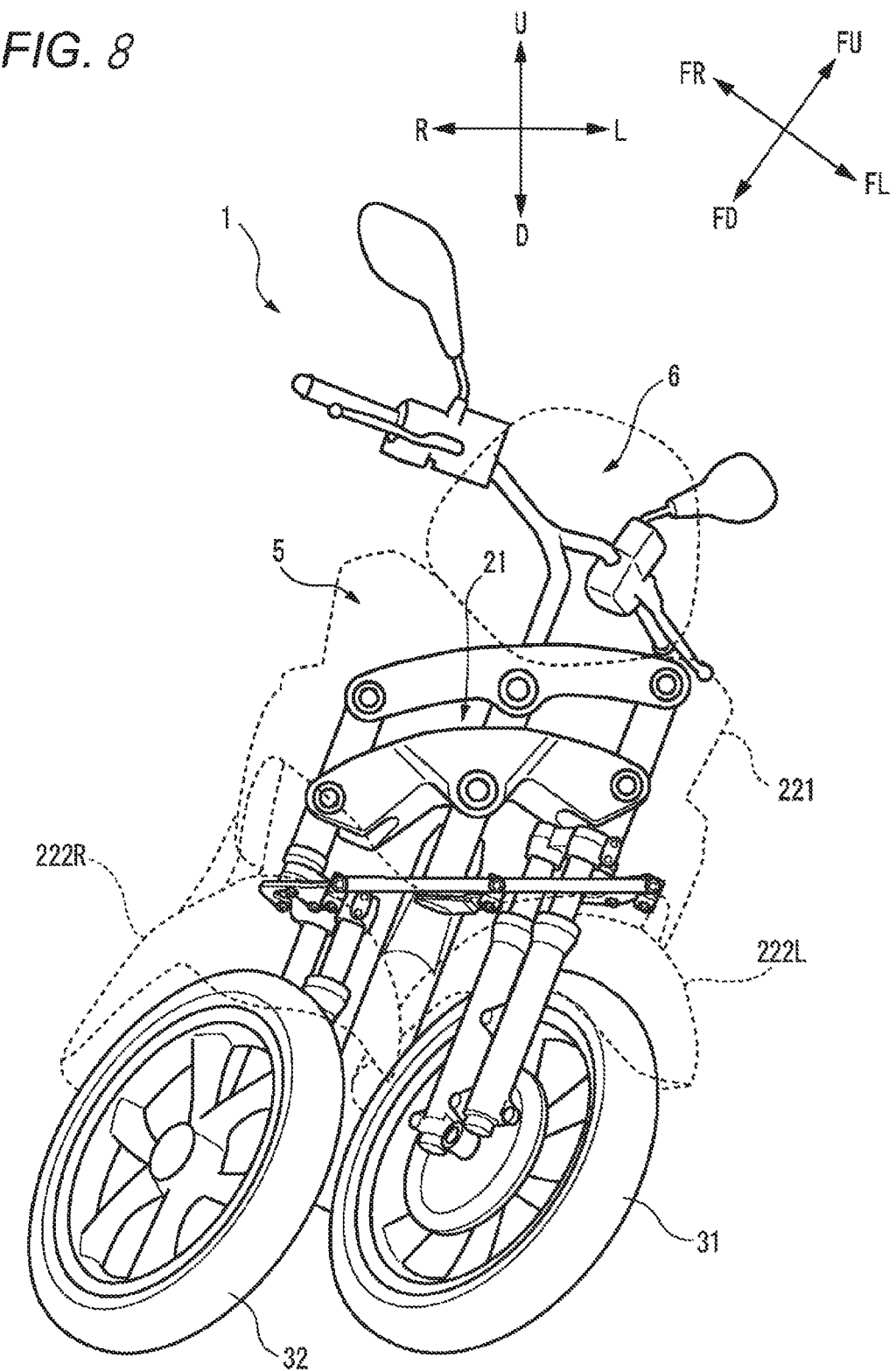
FIG. 8 is a front view showing the front portion of the vehicle shown in FIG. 1 when the vehicle leans to the left and is steered.

FIG. 8 is a front view of the front portion of the vehicle 1 in the front-and-rear direction of the body frame 21 with the vehicle 1 leaning to the left and the front wheels 3 turned to the left. FIG. 8 shows a state which is seen through the front cover 221, the left mudguard 222L and the right mudguard 222R which are shown by dashed lines.

Thus, the vehicle 1 according to the present preferred embodiment includes the body frame 21; the right front wheel 32 and the left front wheel 31 which are aligned side by side in the left-and-right direction of the body frame 21; the right brake 34 which applies a brake force to the right front wheel 32; the left brake 33 which applies a brake force to the left front wheel 31; the left grip 37 (an example of the grip) which the rider grips; and the steering force transmission 6 which transmits a steering force applied to the left grip 37 to the right front wheel 32 and the left front wheel 31.

The steering force transmission 6 includes the steering shaft 652 which turns about the intermediate turning axis Z which extends in the up-and-down direction of the body frame 21; the handlebar 651 which is located at the upper portion of the steering shaft 652; and the tie rod 669 which transmits the turning of the steering shaft 652 to the right front wheel 32 and the left front wheel 31.

The brake operator, which operates at least one of the right brake 34 and the left brake 33, and the grips 37, 38 are located on at least one of the ends of the handlebar 651. In a preferred embodiment, the right brake 36 located on the right end of the handlebar 651 operates the right brake 34 and the left brake 33.

According to the vehicle 1 of the present preferred embodiment, a rubber damper 70 is located on the steering force transmission 6. The rubber damper 70 significantly reduces or prevents the transmission of vibration due to a difference between a frictional force generated between the right front wheel 32 and a corresponding road surface and a frictional force generated between the left front wheel 31 and a corresponding road surface to the left grip 37 and the right grip 38.

Figure 9:
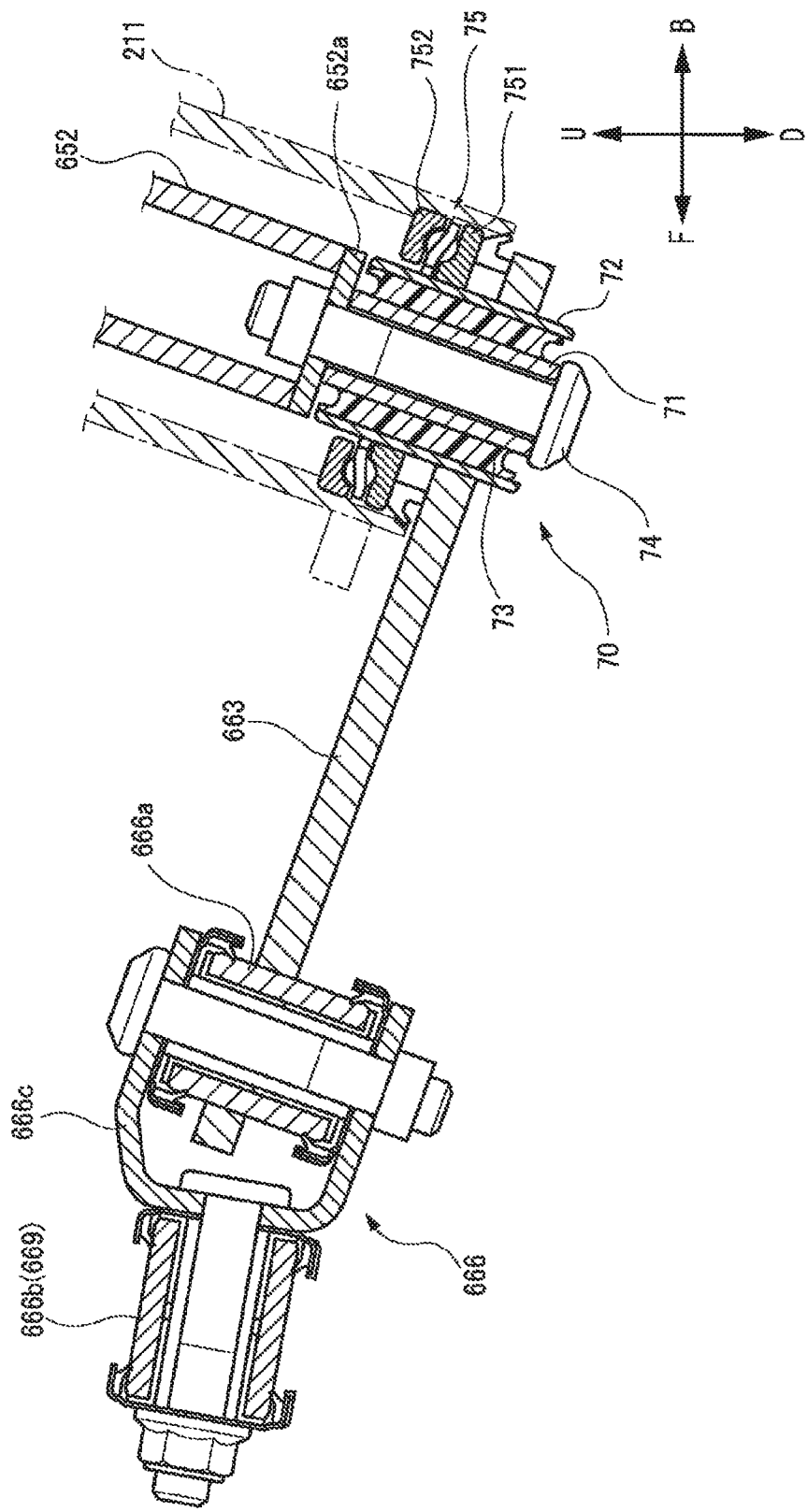
FIG. 9 is a side sectional view showing the lower portion of the steering shaft, a lower portion of a headpipe, a pitman arm, a central joint and a central portion of a tie rod.

FIG. 9 is a side sectional view showing the lower portion of the steering shaft 652, a lower portion of the headpipe 211, the pitman arm 663, the intermediate joint 666 and the tie rod 669. As shown in FIG. 9, the lower portion of the steering shaft 652 is connected to the pitman arm 663 via the rubber damper 70. A portion of the rubber damper 70 is inserted into an interior of the headpipe 211. The rubber damper 70 includes an inner tube 71 (a non-limiting example of an inner member), an outer tube 72 (a non-limiting example of an outer member) and a rubber portion 73.

The inner tube 71 is, for example, a tubular metallic member which extends along the intermediate turning axis Z. A bolt 74 is inserted through an interior of the inner tube 71. The bolt 74 fixes the inner tube 71 to the lower portion of the steering shaft 652. The bolt 74 is screwed into a bottom plate 652a of the steering shaft 652.

The outer tube 72 is, for example, a tubular metallic member which extends concentrically with the inner tube 71. A bore diameter of the outer tube 72 is larger than an outside diameter of the inner tube 71. The outer tube 72 is located outside the inner tube 71. An outside diameter of the outer tube 72 is smaller than a bore diameter of the headpipe 211.

The outer tube 72 is supported on the headpipe 211 via a bearing 75. An inner race 751 of the bearing 75 is fixed to an outer circumferential surface of the outer tube 72. An outer race 752 of the bearing 75 is fixed to an inner wall of the headpipe 211. The outer tube 72 is able to turn relative to the headpipe 211 by the bearing 75.

The pitman arm 663 is fixed to the outer circumferential surface of the outer tube 72 below the bearing 75. The outer tube 72 is fixed relative to the pitman arm 663 such that the outer tube 72 is not displaceable relative to the pitman arm 663.

The rubber portion 73 fills at least a portion of a space or gap defined between the inner tube 71 and the outer tube 72. The rubber portion 73 connects the inner tube 71 and the outer tube 72 together. The rubber portion 73 includes a rubber or rubber-like material having viscoelastic properties. The rubber portion 73 adheres strongly and rigidly to the inner tube 71 and the outer tube 72. For example, the rubber portion 73 is fixed to the inner tube 71 and the outer tube 72 strongly and rigidly by seizing or binding the rubber portion 73 to the inner tube 71 and the outer tube 72.

The inner tube 71 and the outer tube 72 are displaced relative to each other by elastic deformation of the rubber portion 73. The inner tube 71 and the outer tube 72 are displaced relative to each other in the front-and-rear direction of the body frame 21 by elastic deformation of the rubber portion 73. The inner tube 71 and the outer tube 72 are displaced relative to each other in the front-and-rear direction of the body frame 21 and in the left-and-right direction of the body frame 21 by elastic deformation of the rubber portion 73.

The inner tube 71 and the outer tube 72 extend along the intermediate turning axis Z. The intermediate turning axis Z is parallel or substantially parallel to the right extending and contracting axis of the right shock absorber 62 and the left extending and contracting axis of the left shock absorber 61. The inner tube 71 and the outer tube 72 are displaced relative to each other about an axis which is parallel or substantially parallel to the left extending and contracting axis by elastic deformation of the rubber portion 73.

When the rider turns the handlebar 651, the steering shaft 652 turns about the intermediate turning axis Z. Accordingly, the inner tube 71 of the rubber damper 70, which is fixed to the lower portion of the steering shaft 652, turns together with the outer tube 72.

The outer tube 72 of the rubber damper 70 is fixed to the pitman arm 663. The pitman arm 663 is connected to the left front wheel 31 and the right front wheel 32 via the tie rod 669 and the like. Since the left front wheel 31 is in contact with a road surface, a road surface resisting force acts on the left front wheel 31. Since the right front wheel 32 is in contact with a road surface, a road surface resisting force acts on the right front wheel 32. In order to displace the tie rod 669, a force which at least overcomes the road surface resisting forces of the left front wheel 31 and the right front wheel 32 needs to act on the tie rod 669.

When the inner tube 71 is turned within a range of a predetermined angle relative to the outer tube 72, the rubber portion 73 is elastically deformed. Thus, although the inner tube 71 turns, the outer tube 72 does not turn and the pitman arm 663 does not turn.

When a force which is great enough to displace the tie rod 669 is transmitted to the inner tube 71, the inner tube 71 is turned relative to the outer tube 72 by an amount equal to or greater than the predetermined angle. Since the rubber portion 73 cannot be elastically deformed more than the predetermined angle, and the outer tube 72 also turns. When the outer tube 72 turns, the pitman arm 663 which is fixed to the outer tube 72 turns, thus turning the left front wheel 31 and the right front wheel 32 via the tie rod 669.

The rubber damper 70 does not transmit the displacement of the steering shaft 652 to the pitman arm 663 when a relative angle of the inner tube 71 to the outer tube 72 stays within the range of the predetermined angle. For an opposite force transmission path, when the outer tube 72 is displaced relative to the inner tube 71 by vibration of the pitman arm 663, the rubber damper 70 does not transmit the vibration of the pitman arm 663 to the steering shaft 652 when the displacement is within the range of the predetermined angle. That is, the rubber damper 70 dampens or absorbs shock between the steering shaft 652 and the pitman arm 663. The rubber portion 73 of the rubber damper 70 absorbs relative displacement of the steering shaft 652 with respect to the pitman arm 663 about an axis which is parallel or substantially parallel to the right extending and contracting axis.

The elastic displacement of the rubber portion 73 of the rubber damper 70 enables the inner tube 71 and the outer tube 72 to be displaced relative to each other in the front-and-rear direction of the body frame 21 and in the left-and-right direction of the body frame 21. The rubber damper 70 absorbs the relative displacement of the steering shaft 652 with respect to the pitman arm 663 not only in the front-and-rear direction of the body frame 21 but also in the left-and-right direction of the body frame 21.

Thus, shock absorption by the rubber damper 70 may be adjusted by controlling the viscoelastic properties of the rubber portion 73 of the rubber damper 70.

Since the right front wheel 32 and the left front wheel 31 pass over different road surfaces, a frictional force generated between the right front wheel 32 and the corresponding road surface may differ from a frictional force generated between the left front wheel 31 and the corresponding road surface. Since road surfaces on which the right front wheel 32 and the left front wheel 31 pass change moment by moment while the vehicle 1 is traveling, frictional forces acting on the right front wheel 32 and the left front wheel 31 also change moment by moment. When a frictional force generated between the right front wheel 32 and a corresponding road surface differs from a frictional force generated between the left front wheel 31 and a corresponding road surface, vibration is generated in the tie rod 669 which is connected to the right front wheel 32 and the left front wheel 31.

The tie rod 669 is connected to the steering shaft 652. The vibration of the tie rod 669 is able to be transmitted to the left grip 37 and the right grip 38 via the steering shaft 652 and the handlebar 651. When the left grip 37 and the right grip 38 are vibrated, the rider may feel discomfort. Since the rider grips strongly on the left grip 37 and the right grip 38 when applying the brakes, vibration due to the different behaviors of the right front wheel 32 and the left front wheel 31 while applying the brakes tends to be transmitted to the left grip 37 and the right grip 38.

According to the vehicle 1 of the present preferred embodiment, the rubber damper 70 absorbs shock between the steering shaft 652 and the pitman arm 663. The rubber damper 70 significantly reduces or prevents the vibration transmitted from the right front wheel 32 and the left front wheel 31 to the pitman arm 663 from being transmitted to the steering shaft 652. Thus, the rubber damper 70 significantly reduces or prevents the vibration transmitted to the handlebar 651 which is fixed to the steering shaft 652.

The rubber damper 70 significantly reduces or prevents transmission of the vibration due to the difference between the frictional force generated between the right front wheel 32 and the corresponding road surface and the frictional force generated between the left front wheel 31 and the corresponding road surface to the left grip 37 and the right grip 38. Thus, the rubber damper 70 makes it difficult for the vibration to be transmitted to the rider gripping the left grip 37 and the right grip 38 when attempting to apply the brakes.

Vibration like this is not generated in a vehicle including a single front wheel. On a vehicle including a single front wheel, only the vibration of the single front wheel is transmitted to the grips. The vehicle 1 according to the present preferred embodiment includes the right front wheel 32 and the left front wheel 31 connected together by the tie rod 669. When the right front wheel 32 and the left front wheel 31 pass over different road surfaces and display different behaviors, vibration of the right front wheel 32 and vibration of the left front wheel 31 act individually on the tie rod 669. Accordingly, a vibration generated by the single front wheel of the vehicle including the single front wheel is different from the vibration generated by the vehicle 1 including the right front wheel 32 and the left front wheel 31 which might be transmitted to the right grip 38 and the left grip 37.

For example, a vibration force of the single front wheel, the right front wheel, and the left front wheel that acts in the up-and-down direction of the body frame is dominant.

In the vehicle including the single front wheel, the force in the up-and-down direction of the single front wheel is absorbed efficiently by a shock absorber which acts in the up-and-down direction.

However, in addition to the force acting in the up-and-down direction of the body frame, the vibration force of the single front wheel, the right front wheel, and the left front wheel also includes a force acting in the front-and-rear direction and a force acting in the left-and-right direction. The front-and-rear direction of the body frame and the left-and-right direction of the body frame are directions which intersect the direction in which the shock absorbers operate. Thus, it is difficult for the shock absorbers to efficiency absorb the vibration force in the front-and-rear direction and the vibration force in the left-and-right direction.

Accordingly, in the vehicle 1 including the right front wheel and the left front wheel, a vibration force in the front-and-rear direction and a vibration force in the left-and-right direction are transmitted from the right front wheel and the left front wheel into the steering force transmission path. In the steering force transmission path, a steering force applied to the handlebar is transmitted to the steering shaft, the pitman arm and the tie rod, and is divided to be transmitted to the right front wheel and the left front wheel.

In an opposite transmission path, the vibration of the right front wheel and the vibration of the left front wheel are combined at the tie rod, and the combined vibration is transmitted to the tie rod, the pitman arm, the steering shaft and the handlebar.

The vibration force in the front-and-rear direction and the vibration force in the left-and-right direction of the right front wheel and the left front wheel, which the shock absorber has difficulty absorbing, are combined together at the tie rod and may be amplified. The amplified vibration is transmitted to the steering force transmission path which is situated upstream of the tie rod. Thus, the amplified vibration may act on the grips located on the handlebar. With the vehicle 1 including the right front wheel and the left front wheel, the vibration in the front-and-rear direction and the vibration in the left-and-right direction of the front wheels are likely to be amplified and transmitted to the grips.

It is noted that with the vehicle including the single front wheel, since the vibration in the front-and-rear direction and the vibration in the left-and-right direction of the single front wheel are not amplified, the problem described above does not occur.

According to the vehicle 1 of a preferred embodiment, the rubber damper 70 is located between the steering shaft 652 and the pitman arm 663. The rubber damper 70 significantly reduces or prevents the vibration accumulated at the tie rod 669 from being transmitted from the pitman arm 663 to the steering shaft 652. The rubber damper 70 absorbs the relative displacement of the pitman arm 663 with respect to the steering shaft 652. The relative displacement of the outer tube 72, which is fixed to the pitman arm 663, with respect to the inner tube 71, which is fixed to the steering shaft 652, is absorbed by elastic deformation of the rubber portion 73 of the rubber damper 70.

The rubber portion 73 of the rubber damper 70 is located between the outer circumferential surface of the inner tube 71 and an inner circumferential surface of the outer tube 72. Accordingly, it is possible to effectively reduce or prevent the generation of vibration in the front-and-rear direction of the body frame 21, vibration in the left-and-right direction of the body frame 21 and vibration about the intermediate turning axis Z in the inner tube 71 fixed to the steering shaft 652 and the outer tube 72 fixed to the pitman arm 663.

It is possible to effectively reduce or prevent the transmission of the vibration of the right front wheel 32 and the vibration of the left front wheel 31 to the right grip 38 and the left grip 37 with the rubber damper 70.

It should be noted that the vibration described here is also not generated in a four-wheeled vehicle including a steering wheel. The vibration is generated in a vehicle where the rider grips the brake operators. The vibration is a characteristic phenomenon in the vehicle 1 including two front wheels in which the brake operators are located on the grips. In the four-wheeled vehicle, the brakes are not applied by hand. Thus, there is no vibration transmitted to the driver from the steering wheel.

In a preferred embodiment, the steering force transmission 6 includes the pitman arm 663 which is fixed to the steering shaft 652 at the one end and is connected to the tie rod 669 at the other end such that the pitman arm 663 turns relative to the tie rod 669. The rubber damper 70 is located between the steering shaft 652 and the pitman arm 663, and a steering force applied to the left grip 37 and the right grip 38 is transmitted from the steering shaft 652 to the pitman arm 663 by the rubber damper 70.

In the vehicle 1 according to a preferred embodiment, the steering force transmission path includes, from an upstream side to a downstream side, the left grip 37 and the right grip 38, the handlebar 651, the steering shaft 652, the pitman arm 663, the tie rod 669, the left transmission plate 664 and the right transmission plate 665, the left shock absorber 61 and the right shock absorber 62, and the left front wheel 31 and the right front wheel 32.

In the steering force transmission path, the rubber damper 70 is located on the pitman arm 663 and the steering shaft 652, which are located upstream of the tie rod 669, where the vibration of the right front wheel 32 and the vibration of the left front wheel 31 are combined together. Thus, the vibration of the right front wheel 32 and the vibration of the left front wheel 31 transmitted to the grips 37, 38 is significantly reduced or prevented by the single rubber damper 70.

According to the vehicle 1 of a preferred embodiment, the rubber damper 70 which is located between the steering shaft 652 and the pitman arm 663 significantly reduces or prevents the vibration of the steering shaft 652, the handlebar 651, the left grip 37, and the right grip 38, which are all supported on the headpipe 211. Since the rubber damper 70 significantly reduces or prevents the vibration of the steering shaft 652, the handlebar 651, the left grip 37, and the right grip 38, which are supported on the headpipe 211, it is possible to eliminate a risk of the vibration being transmitted from the steering shaft 652, the handlebar 651, the left grip 37, and the right grip 38 to the body frame 21 by the headpipe 211. This reduction of vibration enhances the comfort of the rider.

The vehicle 1 according to a preferred embodiment preferably includes the right shock absorber 62 which supports the right front wheel 32 such that the right front wheel 32 is rotatable and displaceable relative to the body frame 21; and the left shock absorber 61 which supports the left front wheel 31 such that the left front wheel 31 is rotatable and displaceable relative to the body frame 21.

Even though the right shock absorber 62 and the left shock absorber 61 are provided on the vehicle 1, the transmission of the vibration due to the difference between the friction force generated between the right front wheel 32 and the corresponding road surface and the frictional force generated between the left front wheel 31 and the corresponding road surface to the left grip 37 and the right grip 38 cannot be reduced effectively. As described above, the vibration forces which attempt to displace the right front wheel 32 and the left front wheel 31 in the front-and-rear diction and the left-and-right direction of the body frame 21 cannot be effectively reduced by the right shock absorber 62 which supports displacement of the right front wheel 32 in the up-and-down direction and the left shock absorber 61 which supports displacement of the left front wheel 31 in the up-and-down direction.

In addition, since the vibration displaces the right shock absorber 62 together with the right front wheel 32 and also displaces the left shock absorber 61 together with the left front wheel 31, the displacement forces become large. In the event that the vibration of these large forces are transmitted to the handlebar 651, the amplitude of the vibration is increased, leading to discomfort of the rider.

However, the vibration transmitted to the left grip 37 and the right grip 38 is reduced or prevented efficiently, making it possible to reduce the discomfort felt by the rider.

The inner tube 71 and the outer tube 72 turn relative to each other about the axis which follows the intermediate turning axis Z. The intermediate turning axis Z is parallel or substantially parallel to the right extending and contracting axis of the right shock absorber 62 and the left extending and contracting axis of the left shock absorber 61. The inner tube 71 and the outer tube 72 turn relative to each other in the front-and-rear direction and the left-and-right direction of the body frame 21, and along the axis which follows the right extending and contracting axis as long as the rubber portion 73 is deformed elastically.

According to the vehicle 1 of a preferred embodiment, since the rubber damper 70 is displaced in the front-and-rear direction of the body frame 21, it is possible to absorb the vibration in the front-and-rear direction of the body frame 21.

According to the vehicle 1 of a preferred embodiment, since the rubber damper 70 is displaced in the left-and-right direction of the body frame 21, it is possible to absorb the vibration in the left-and-right direction of the body frame 21.

According to the vehicle 1 of a preferred embodiment, the rubber damper 70 includes the outer tube 71 and the inner tube 72, which extend along the right extending and contracting direction and the left extending and contracting direction, and the rubber portion 73 which is interposed between the outer tube 71 and the inner tube 72. The relative displacement of the outer tube 71 with respect to the inner tube 72 in the front-and-rear direction and the left-and-right direction of the body frame 21 is by elastic deformation of the rubber portion 73.

According to the vehicle 1 of a preferred embodiment, since the rubber damper 70 is displaced about the axis which follows the right extending and contracting axis and the left extending and contracting axis, the rubber damper 70 significantly reduces or prevents the vibration acting in the direction in which the right shock absorber 62 and the left shock absorber 61 have difficulty in absorbing vibration. Since the vehicle 1 according to a preferred embodiment includes the rubber damper 70, the right shock absorber 62 and the left shock absorber 61, it is difficult for the vibration due to the left front wheel 31 and the right front wheel 32 to be transmitted to the rider.

In the vehicle 1 according to a preferred embodiment, the linkage 5 includes the upper cross member 51 and the lower cross member 52 (a non-limiting example of cross members) which are supported on the body frame 21 such that the upper cross member 51 and the lower cross member 52 turn about the link axes which extend in the front-and-rear direction of the body frame 21. The linkage 5 supports the right front wheel 32 and the left front wheel 31 such that the right front wheel 32 and the left front wheel 31 are displaced relative to the body frame 21 in the up-and-down direction of the body frame 21, such that the linkage 5 causes the body frame 21 to lean to the right of the vehicle 1 when the vehicle 1 is turned to the right and causes the body frame 21 to lean to the left when the vehicle 1 is turned to the left.

The vibration of the right front wheel 32 and the left front wheel 31 tends to be transmitted via the linkage 5 to the body frame 21, the handlebar 651, which is turnably supported on the body frame 21, and the grips 37, 38 located on the handlebar 651. Since the linkage 5 includes highly rigid members, it is difficult for vibration transmitted to the linkage 5 to be absorbed by the linkage 5. In the vehicle 1 including the linkage 5, the vibration of the right front wheel 32 and the left front wheel 31 would tend to be transmitted to the grips 37, 38. In addition, since the upper cross member 51 and the lower cross member 52 turn about the link axes which extend in the front-and-rear direction of the body frame 21, the linkage 5 has difficulty in reducing the vibration of the right front wheel 32 and the left front wheel 31 which acts in the front-and-rear direction. The vibration of the right front wheel 32 and the left front wheel 31 acting in the front-and-rear direction that is transmitted to the grips 37, 38 is significantly reduced or prevented by the rubber damper 70.

In the vehicle 1 according to a preferred embodiment, the linkage 5 includes the right side member 54 that is supported such that the right side member 54 turns about the right axis which extends in the front-and-rear direction of the body frame 21 at right portions of the cross members (the upper cross member 51 and the lower cross member 52) and that supports the right front wheel 32 such that the right front wheel 32 turns about the right turning axis Y which extends in the up-and-down direction of the body frame 21; and the left side member 53 that is supported such that the left side member 53 turns about the left axis which extends parallel or substantially parallel to the right axis at left portion of the cross members (the upper cross member 51 and the lower cross member 52) and that supports the left front wheel 31 such that the left front wheel 31 turns about the left turning axis X which is parallel or substantially parallel to the right turning axis Y.

The parallelogram linkage 5 includes the left side member 53 and the right side member 54 which maintain the parallel or substantially parallel relationship with each other, as described above. The left side member 53 supports the left front wheel 31 such that the left front wheel 31 turns about the left turning axis X. The right side member 54 supports the right front wheel 32 such that the right front wheel 32 turns about the right turning axis Y.

The left side member 53 and the right side member 54 transmit the steering angle from the handlebar 651 to the left front wheel 31 and the right front wheel 32. The left side member 53 rigidly supports the left front wheel 31 so that the turning axis of the left front wheel 31 does not deviate from the left turning axis X. The right side member 54 rigidly supports the right front wheel 32 so that the turning axis of the right front wheel 32 does not deviate from the right turning axis Y.

The shock absorbers are located between the left side member 53 and the left front wheel 31 and between the right side member 54 and the right front wheel 32. Thus, vibration generated in the left front wheel 31 and the right front wheel 32 tends to be transmitted to the vehicle 1 through the left side member 53 and the right side member 54.

In the vehicle 1 according to a preferred embodiment, however, the rubber damper 70 is located on the steering force transmission 6. Accordingly, the vibration transmitted to the left grip 37 and the right grip 38 is significantly reduced or prevented, the left side member 53 is able to rigidly support the left front wheel 31, and the right side member 54 is able to rigidly support the right front wheel 32.

Second Preferred Embodiment

Figure 10:
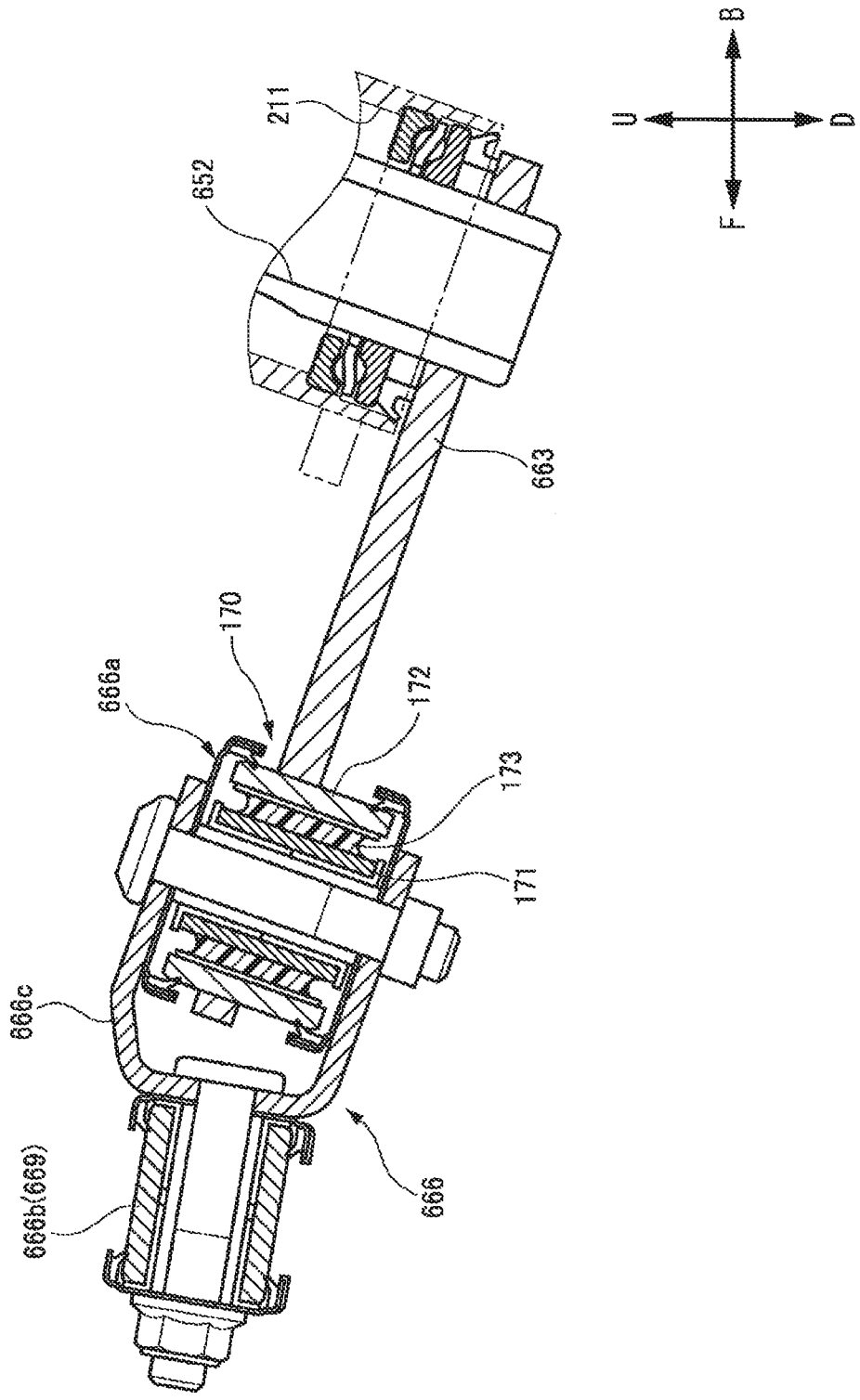
FIG. 10 is a view, corresponding to FIG. 9, which shows a vehicle according to a second preferred embodiment of the present invention.

While the rubber damper 70 is described as preferably being located between the steering shaft 652 and the pitman arm 663 in the first preferred embodiment, the present invention is not limited thereto. FIG. 10 is a view, corresponding to FIG. 9, which shows a vehicle 1 according to a second preferred embodiment of the present invention.

As shown in FIG. 10, a steering force transmission 6 includes a pitman arm 663 which is fixed to a steering shaft 652 at one end and is connected to a tie rod 669 at the other end such that the pitman arm 663 turns relative to the tie rod 669. A rubber damper 170 is located between the tie rod 669 and the pitman arm 663. In the vehicle 1 according to the present preferred embodiment, a steering force applied to a left grip 37 and a right grip 38 is transmitted from the pitman arm 663 to the tie rod 669 by the rubber damper 170.

The rubber damper 170 includes an inner tube 171, an outer tube 172 and a rubber portion 173. The outer tube 172 turns about an axis which is parallel or substantially parallel to an intermediate turning axis Z relative to the inner tube 171. The rubber portion 173 fills at least a portion of a space or gap defined between the inner tube 171 and the outer tube 172 to connect the inner tube 171 and the outer tube 172 together. The rubber portion 173 includes a rubber or rubber-like material having viscoelastic properties.

The rubber damper 170 is preferably incorporated in an intermediate rear bearing 666a of an intermediate joint 666. The inner tube 171 is fixed to a shaft of the intermediate rear bearing 666a. The outer tube 172 is fixed to a front end of the pitman arm 663.

When the rider turns a handlebar 651, the steering shaft 652 and the pitman arm 663 turn about the intermediate turning axis Z. The outer tube 172 of the rubber damper 170, which is fixed to the front end of the pitman arm 663, is displaced relative to the inner tube 171 as long as the rubber portion 173 is deformed elastically.

When a force which is great enough to displace the tie rod 669 is transmitted to the outer tube 172 and the outer tube 172 is turned relative to the inner tube 171 within a range of a predetermined angle, the rubber portion 173 is deformed elastically. Although the outer tube 172 is displaced eccentrically relative to the inner tube 171, the inner tube 171 and the intermediate joint 666 remain stationary. The outer tube 172 is displaced in a plane which intersects the intermediate turning axis Z along which the inner tube 171 extends, for example, in a front-and-rear direction and a left-and-right direction of a body frame 21 relative to the inner tube 171.

When the outer tube 172 is turned the predetermined angle or greater relative to the inner tube 171, the rubber portion 173 cannot be deformed elastically any more. The inner tube 171 is displaced with the turning of the outer tube 172 and the rubber portion 173, and the inner tube 171 and the intermediate joint 666 are displaced to the left or right. A left front wheel 31 and a right front wheel 32 are turned via the tie rod 669 which is connected to the intermediate joint 666.

When a relative angle between the inner tube 171 and the outer tube 172 stays within the predetermined angle, the rubber damper 170 does not transmit the displacement of the pitman arm 663 to the tie rod 669. In an opposite force transmission path, even though the inner tube 171 is displaced relative to the outer tube 172 within the range of the predetermined angle due to vibration of the tie rod 669, the rubber damper 170 does not transmit the vibration of the tie rod 669 to the pitman arm 663. The rubber damper 170 absorbs shock between the pitman arm 663 and the tie rod 669. The displacement of the outer tube 172 in a plane which intersects the intermediate turning axis Z at right angles (the plane being also defined by the front-and-rear direction and the left-and-right direction of the body frame 21) relative to the inner tube 171 is absorbed by elastic deformation of the rubber portion 173. Shock absorption by the rubber damper 170 may be adjusted by controlling the viscoelastic properties of the rubber portion 173 of the rubber damper 170.

According to the vehicle 1 of the present preferred embodiment, the rubber damper 170 reduces or prevents the vibration transmitted from the right front wheel 32 and the left front wheel 31 to the tie rod 669 from being transmitted to the pitman arm 663. Thus, the rubber damper 170 reduces or prevents the vibration from being transmitted from the pitman arm 663 to the handlebar 651 by the steering shaft 652.

The rubber damper 170 significantly reduces or prevents the transmission of the vibration, which is due to a difference between a frictional force generated between the right front wheel 32 and a corresponding road surface and a frictional force generated between the left front wheel 31 and a corresponding road surface, to the left grip 37 and the right grip 38. The rubber damper 170 makes it difficult for the vibration to be transmitted to the rider gripping the left grip 37 and the right grip 38 when attempting to apply the brakes.

According to the vehicle 1 of the present preferred embodiment, since the vibration is reduced near the right front wheel 32 and the left front wheel 31, which is a source of the vibration, it is possible to reduce or prevent the vibration of the pitman arm 663, the steering shaft 652 and the handlebar 651 which are located upstream of the tie rod 669 in the steering force transmission path.

Third Preferred Embodiment

Figure 11:
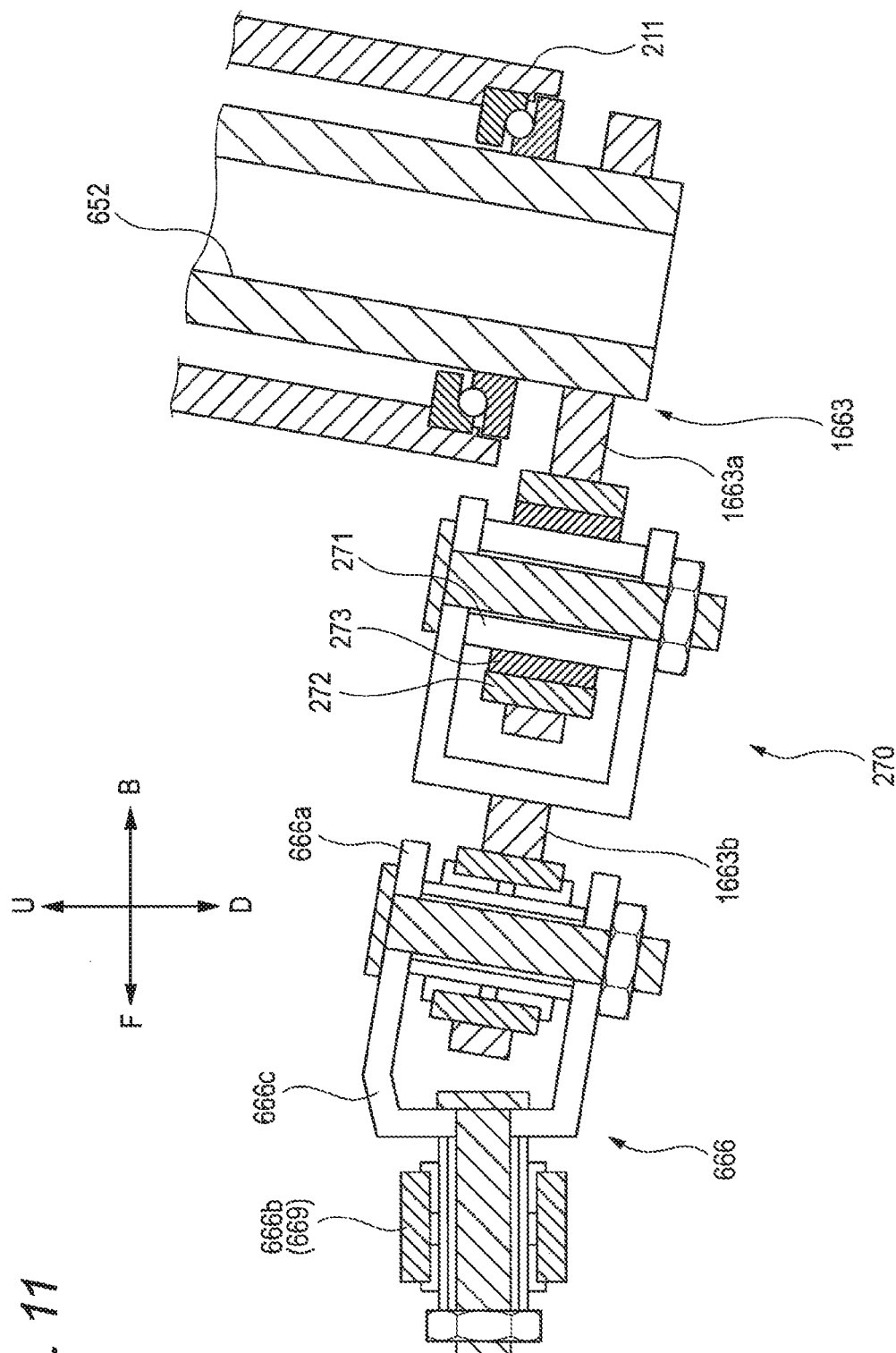
FIG. 11 is a view showing a rubber damper of a vehicle according to a third preferred embodiment of the present invention.

FIG. 11 is a view showing a rubber damper 270 of a vehicle 1 according to a third preferred embodiment of the present invention. As shown in FIG. 11, the rubber damper 270 in the present preferred embodiment is preferably incorporated into a pitman arm 1663. In a preferred embodiment, the pitman arm 1663 includes a rear portion 1663a and a front portion 1663b. The rear portion 1663a is fixed to a lower portion of a steering shaft 652. The front portion 1663b is connected to a tie rod 669 via an intermediate joint 666. The rubber damper 270 is located between the rear portion 1663a and the front portion 1663b.

The rubber damper 270 includes an inner tube 271, an outer tube 272 and a rubber portion 273. The outer tube 272 turns about an axis which is parallel or substantially parallel to an intermediate turning axis Z relative to the inner tube 271. The rubber portion 273 fills at least a portion of a space or gap defined between the inner tube 271 and the outer tube 272 to connect the inner tube 271 and the outer tube 272 together. The rubber portion 273 includes a rubber or rubber-like material having viscoelastic properties.

The rubber damper 270 is preferably incorporated into the pitman arm 1663. The inner tube 271 is fixed to the front portion 1663b of the pitman arm 1663. The outer tube 272 is fixed to the rear portion 1663a of the pitman arm 1663.

When the rider turns a handlebar 651, the steering shaft 652 and the rear portion 1663a of the pitman arm 1663 turn about the intermediate turning axis Z. The outer tube 272 of the rubber damper 270, which is fixed to the rear portion 1663a of the pitman arm 1663, is displaced relative to the inner tube 271.

When a force that is great enough to displace the tie rod 669 is transmitted to the outer tube 272 and the outer tube 272 is displaced relative to the inner tube 271 within a range of a predetermined amount, the rubber portion 273 is deformed elastically. Although the outer tube 272 is displaced, the inner tube 271 and the front portion 1663b of the pitman arm 1663 remain stationary.

When the outer tube 272 is displaced the predetermined amount or greater relative to the inner tube 271, the rubber portion 273 cannot be deformed elastically any more. The inner tube 271 moves with the outer tube 272 and the rubber portion 273, and the inner tube 271 and the front portion 1663b of the pitman arm 1663 are displaced to the left or right. A left front wheel 31 and a right front wheel 32 are turned by the front portion 1663b of the pitman arm 1663, the intermediate joint 666 and the tie rod 669.

When the relative displacement amount between the inner tube 271 and the outer tube 272 stays within the predetermined amount, the rubber damper 270 does not transmit the displacement of the rear portion 1663a to the front portion 1663b of the pitman arm 1663. In an opposite force transmission path, even though the front portion 1663b of the pitman arm 1663 and the inner tube 271 are displaced relative to the outer tube 272 within the range of the predetermined amount by the vibration of the tie rod 669, the rubber damper 270 does not transmit the vibration of the tie rod 669 to the rear portion 1663a of the pitman arm 1663. The rubber damper 270 absorbs shock between the front portion 1663b and the rear portion 1663a of the pitman arm 1663. Shock absorption by the rubber damper 270 may be adjusted by controlling the viscoelastic properties of the rubber portion 273 of the rubber damper 270.

According to the vehicle 1 of the present preferred embodiment, the rubber damper 270 reduces or prevents the vibration transmitted from the right front wheel 32 and the left front wheel 31 to the tie rod 669 from being transmitted to the rear portion 1663a of the pitman arm 1663. Thus, the rubber damper 270 reduces or prevents the vibration from being transmitted from the rear portion 1663a of the pitman arm 1663 to the handlebar 651 by the steering shaft 652.

The rubber damper 270 significantly reduces or prevents the transmission of the vibration, which is due to a difference between a frictional force generated between the right front wheel 32 and a corresponding road surface and a frictional force generated between the left front wheel 31 and a corresponding road surface, to the grips. The rubber damper 270 reduces or prevents the vibration transmitted to the rider gripping the left grip 37 and the right grip 38 when attempting to apply the brakes.

Fourth Preferred Embodiment

Figure 12:
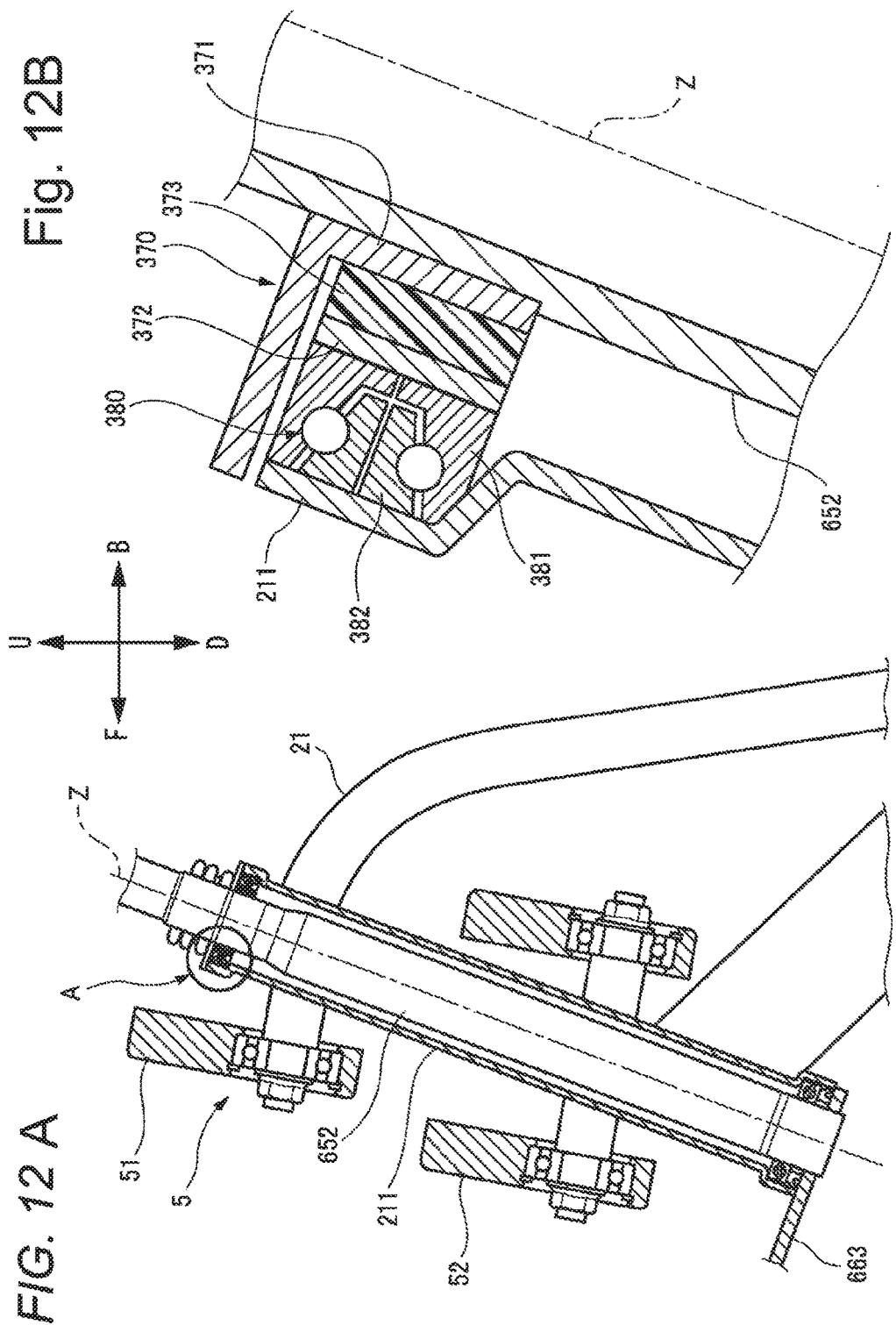
FIGS. 12A and 12B are views showing a rubber damper of a vehicle according to a fourth preferred embodiment of the present invention.

FIGS. 12A and 12B are views showing a rubber damper 370 of a vehicle 1 according to a fourth preferred embodiment of the present invention. FIGS. 12A and 12B show side sectional views of a headpipe 211. FIG. 12A shows the whole headpipe 211, and FIG. 12B shows a portion A in FIG. 12A in an enlarged manner. As shown in FIGS. 12A and 12B, the rubber damper 370 of the present preferred embodiment is preferably located between the headpipe 211 and a steering shaft 652.

The rubber damper 370 includes an inner tube 371, an outer tube 372 and a rubber portion 373. The inner tube 371 is fixed to the steering shaft 652. The outer tube 372 is fixed to the headpipe 211. The outer tube 372 turns about an intermediate turning axis Z relative to the inner tube 371. The rubber portion 373 fills at least a portion of a space or gap defined between the inner tube 371 and the outer tube 372 to connect the inner tube 371 and the outer tube 372 together. The rubber portion 373 includes a rubber or rubber-like material having viscoelastic properties.

The steering shaft 652 is supported on the head pipe 211 via a bearing 380. The inner tube 371 is fixed to an outer circumferential surface of the steering shaft 652. The outer tube 372 is fixed to an inner race 381 of the bearing 380. An outer race 382 of the bearing 380 is fixed to the headpipe 211. The rubber portion 373 is located between the inner tube 371 and the outer tube 372.

When the rider turns a handlebar 651 from a certain angular position, the steering shaft 652 turns about the intermediate turning axis Z. The inner tube 371 of the rubber damper 370, which is fixed to the steering shaft 652, turns relative to the outer tube 372 within a range of elastic deformation of the rubber portion 373.

When a force which is great enough to displace a tie rod 669 is transmitted to the inner tube 371 and the inner tube 371 is turned relative to the outer tube 372 within a range of a predetermined angle, the rubber portion 373 is deformed elastically. Although the inner tube 371 is displaced, the outer tube 372 remains stationary. A force required to displace the rubber portion 373 elastically is smaller than a rotational resisting force of the bearing 380. The rubber portion 373 is deformed elastically before the inner race 381 turns relative to the outer race 382 of the bearing 380. When the rider removes his or her hands from the handlebar 651, the handle bar 651 is returned to an initial angular position due to an elastic restoration force generated by the rubber portion 373.

When the inner tube 371 is turned a predetermined angle or greater from the certain angular position relative to the outer tube 372, the rubber portion 373 cannot be elastically deformed any more, turning torque which attempts to turn the inner tube 371 overcomes the rotational resisting force of the bearing 380, such that the outer tube 372 turns together with the inner tube 371.

Vibration of a right front wheel 32 is transmitted to an upper cross member 51 and a lower cross member 52 by a right shock absorber 62, a right turning member of a right bracket 64 and a right side member 54. Vibration of a left front wheel 31 is transmitted to the upper cross member 51 and the lower cross member 52 by a left shock absorber 61, a left turning member of a left bracket 63 and a left side member 53. The vibration of the right front wheel 32 and the vibration of the left front wheel 31 are combined together and are amplified at the upper cross member 51 and the lower cross member 52. The vibration amplified at the upper cross member 51 and the lower cross member 52 would tend to be transmitted to grips 37, 38 by the headpipe 211, the steering shaft 652 and the handlebar 651.

According to the vehicle of the present preferred embodiment, the rubber damper 370 is located between the headpipe 211 and the steering shaft 652. Thus, it is possible to reduce or prevent the transmission of the amplified vibration from the headpipe 211 to the steering shaft 652. The amplified vibration forces are in a front-and-rear direction of a body frame 21, a left-and-right direction of a body frame 21 and about an axis which is parallel or substantially parallel to a right extending and contracting axis, which are difficult to attenuate by the right shock absorber 62 and the left shock absorber 61. The rubber damper 370 is located between the steering shaft 652 and the headpipe 211 which extend along the intermediate turning axis Z which is parallel or substantially parallel to the right extending and contracting axis. The outer tube 372 of the rubber damper 370 is fixed to the headpipe 211 and the inner tube 371 is fixed to the steering shaft 652. The relative displacement between the headpipe 211, to which the outer tube 372 is fixed, and the steering shaft 652, to which the inner tube 371 is fixed, in the front-and-rear direction and the left-and-right direction of the body frame 21 and about the axis which is parallel or substantially parallel to the right extending and contracting axis is absorbed by elastic deformation of the rubber portion.

Even though the steering shaft 652 is displaced relative to the headpipe 211 within the range of the predetermined angle due to the vibration from the left front wheel 31 and the right front wheel 32, the rubber damper 370 absorbs the vibration of the steering shaft 652. The rubber damper 370 dampens or absorbs shock between the steering shaft 652 and the headpipe 211. Shock absorption by the rubber damper 370 may be adjusted by controlling the viscoelastic properties of the rubber portion 373 of the rubber damper 370.

In the vehicle according to the present preferred embodiment, the body frame 21 includes the headpipe 211 through which the steering shaft 652 is inserted, and the rubber damper 370 located between the headpipe 211 and the steering shaft 652.

With the vehicle 1 according to the present preferred embodiment, since the rubber damper 370 is located in an interior of the headpipe 211, there is no need to provide a space for the rubber damper 370. Since this obviates the need to modify the layout of existing vehicles, the design of the vehicle is facilitated.

Fifth Preferred Embodiment

Figure 13:
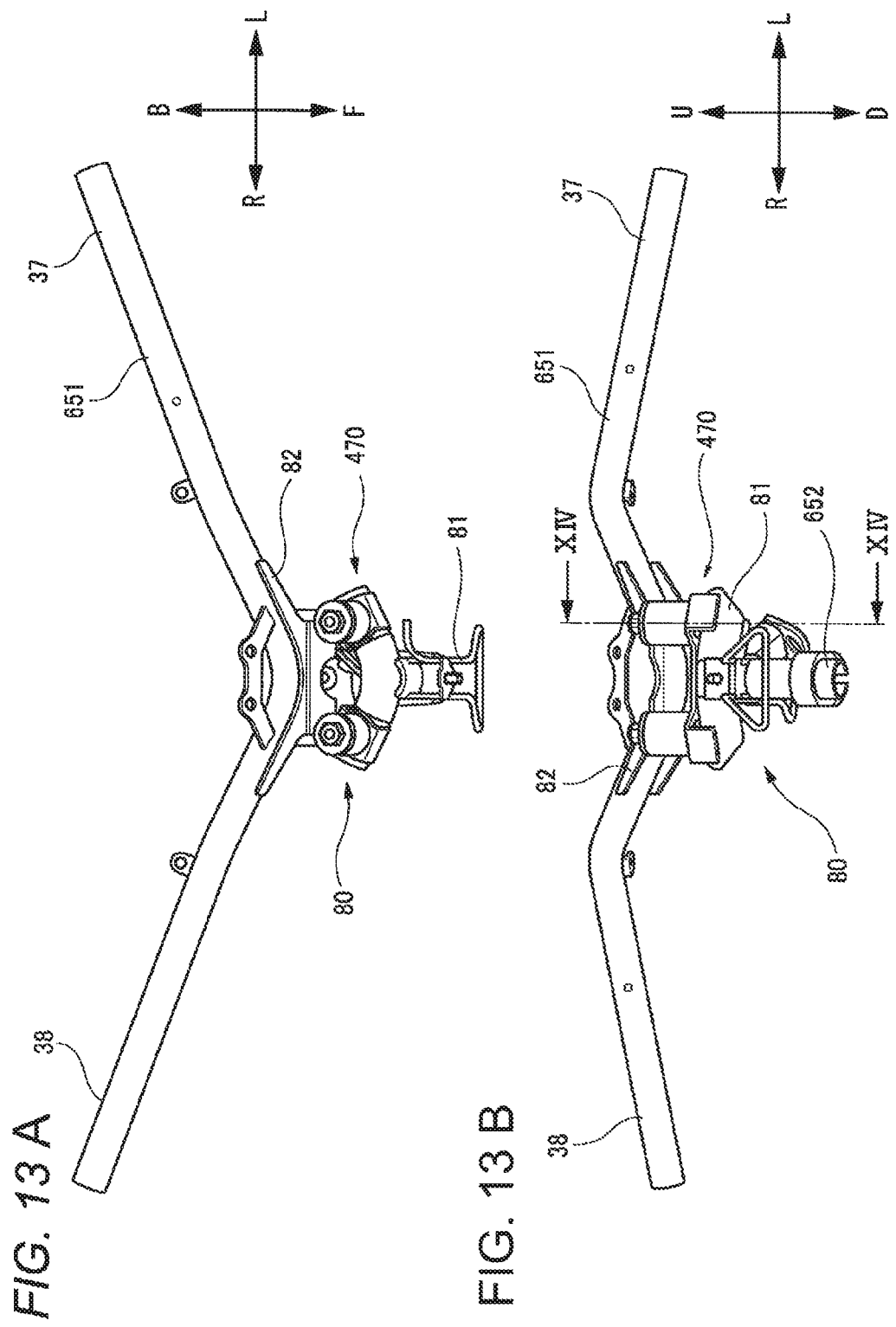
FIGS. 13A and 13B are views showing a rubber damper of a vehicle according to a fifth preferred embodiment of the present invention.
Figure 14:
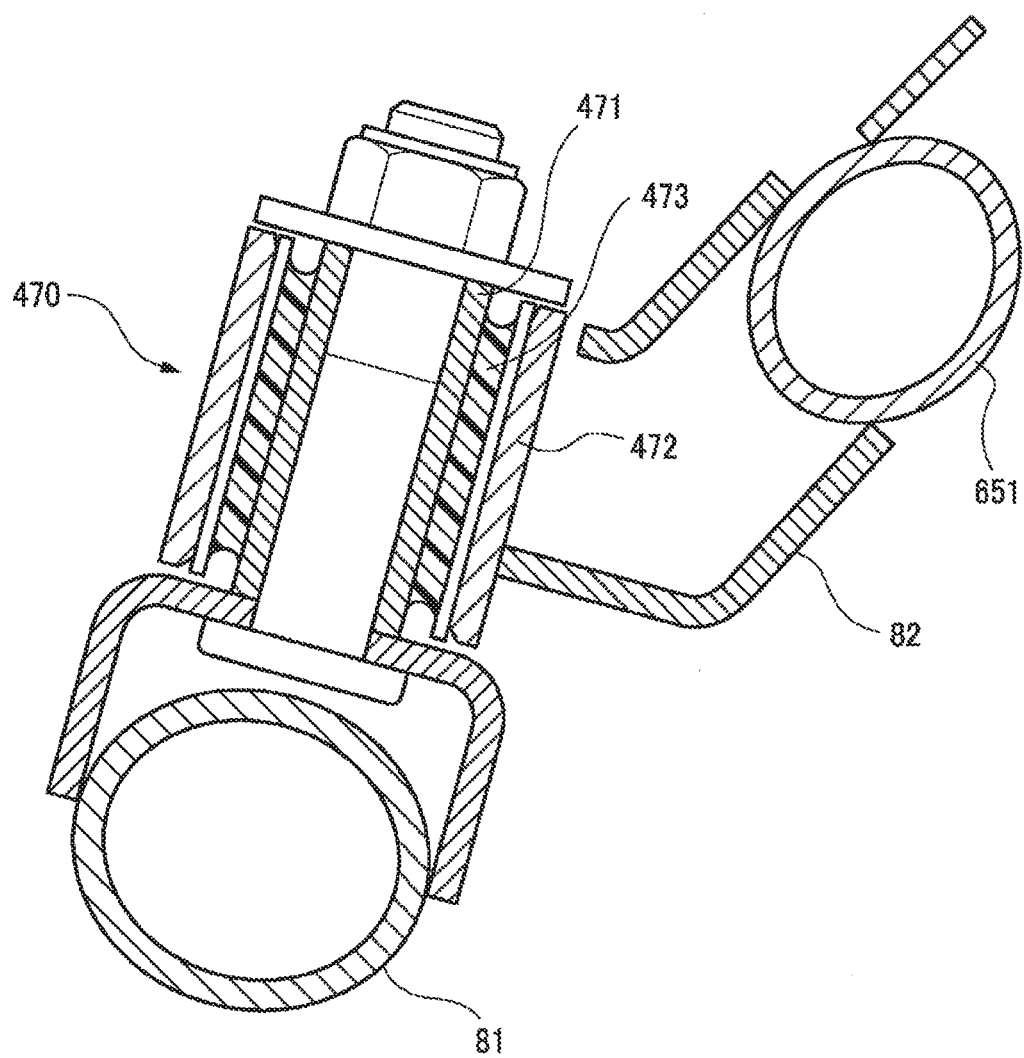
FIG. 14 is a sectional view showing the rubber damper of the vehicle according to the fifth preferred embodiment of the present invention.

FIGS. 13A, 13B, and FIG. 14 are views showing a rubber damper 470 of a vehicle 1 according to a fifth preferred embodiment of the present invention. FIG. 13A is a top view of a handlebar 651 and the rubber damper 470. FIG. 13B is a front view of the handlebar 651 and the rubber damper 470. FIG. 14 is a sectional view taken along a line defined by arrows XIV and viewed from a direction indicated by the arrows XIV in FIG. 13B. As shown in FIGS. 13A, 13B, and FIG. 14, the rubber damper 470 is preferably located between a steering shaft 652 and the handlebar 651.

As shown in FIGS. 13A and 13B, a handlebar post 80 is located on an upper portion of the steering shaft 652. The rubber damper 470 is located on the handlebar post 80. The handlebar post 80 includes a shaft connector 81 which is fixed to the upper portion of the steering shaft 652 and a handlebar connector 82 which is fixed to the handlebar 651. The shaft connector 81 is preferably a T-shaped or substantially T-shaped member when seen from the front. The steering shaft 652 is fixed to a lower portion of the shaft connector 81. An upper portion of the shaft connector 81 extends in a left-and-right direction.

As shown in FIG. 14, the rubber damper 470 includes an inner tube 471, an outer tube 472 and a rubber portion 473. The outer tube 472 is displaced relative to the inner tube 471 via the rubber portion 473. The rubber portion 473 fills at least a portion of a space or gap defined between the inner tube 471 and the outer tube 472 to connect the inner tube 471 and the outer tube 472 together. The inner tube 471 is fixed to the shaft connector 81. The outer tube 472 is fixed to the handlebar connector 82. The rubber portion 473 includes a rubber or rubber-like material having viscoelastic properties.

When the rider turns the handlebar 651, the handlebar connector 82 is displaced relative to the shaft connector 81 within a range where the rubber portion 473 is deformed elastically. The outer tube 472 of the rubber damper 470 which is fixed to the handlebar connector 82 is displaced relative to the inner tube 471.

When the outer tube 472 is turned within a range of a predetermined amount relative to the inner tube 471, the rubber portion 473 is elastically deformed. Although the outer tube 472 is displaced, the inner tube 471, the shaft connector 81 and the steering shaft 652 remain stationary.

When the outer tube 472 is displaced the predetermined amount or greater relative to the inner tube 471 (or the handlebar connector 82 is brought into contact with the shaft connector 81), the rubber portion 473 cannot be deformed elastically any more and the inner tube 471 and the shaft connector 81 are displaced. A left front wheel 31 and a right front wheel 32 are turned by the steering shaft 652, a pitman arm 663 and a tie rod 669.

When the relative displacement amount between the inner tube 471 and the outer tube 472 stays within the predetermined amount, the rubber damper 470 does not transmit the displacement of the handlebar connector 82 to the shaft connector 81. In an opposite force transmission path, even though the shaft connector 81 and the inner tube 471 are displaced relative to the outer tube 472 within the range of the predetermined amount due to vibration of the steering shaft 652, the rubber damper 470 does not transmit the vibration of the steering shaft 652 to the handlebar 651. The rubber damper 470 dampens or absorbs shock between the steering shaft 652 and the handlebar 651. Shock absorption by the rubber damper 470 may be adjusted by controlling the viscoelastic properties of the rubber portion 473 of the rubber damper 470.

According to the vehicle 1 of the present preferred embodiment, the rubber damper 470 reduces or prevents the vibration transmitted from the right front wheel 32 and the left front wheel 31 to the steering shaft 652 from being transmitted to the handlebar 651.

The rubber damper 470 significantly reduces or prevents the transmission of the vibration due to a difference between a frictional force generated between the right front wheel 32 and a corresponding road surface and a frictional force generated between the left front wheel 31 and a corresponding road surface to a left grip 37 and a right grip 38. The rubber damper 470 reduces or prevents the vibration transmitted to the rider gripping the left grip 37 and the right grip 38 when attempting to apply the brakes.

In the vehicle 1 according to the present preferred embodiment, the rubber damper 470 is located between the handlebar 651 and the steering shaft 652, and a steering force applied to the left grip 37 and the right grip 38 is transmitted from the handlebar 651 to the steering shaft 652 via the rubber damper 470.

According to the vehicle 1 of the present preferred embodiment, since the rubber damper 470 is adjacent to or in the vicinity of the handlebar 651, all or substantially all of the vibration transmitted to the left grip 37 and the right grip 38, including vibration which is transmitted to the handlebar 651 via a body frame 21 from a portion (for example, a rear wheel 4) other than the right front wheel 32 and the left front wheel 31, is significantly reduced or prevented.

Modified Preferred Embodiments

In the preferred embodiments described above, while the rubber damper is described as preferably including the inner tube and the outer tube, the present invention is not limited thereto. In a preferred embodiment of the invention, in addition to the tubular member, the inner tube and the outer tube may include an annular member, an annular member which is partially cut out or a tubular member having an axial slit.

The rubber damper may be incorporated in the steering force transmission 6 or may be incorporated between another element and the steering force transmission 6. Alternatively, the rubber damper may be incorporated between the steering force transmission 6 and an element which supports the steering force transmission 6, for example, the body frame 21. As long as at least a portion of the rubber damper is attached directly or indirectly to the steering force transmission 6, the vibration which is transmitted from the left front wheel 31 and the right front wheel 32 to the left grip 37 and the right grip 38 is significantly reduced or prevented.

In the preferred embodiments described above, while it is described that the operation of the right brake operator 36 preferably activates the left brake 33 and the right brake 34 and that an operation of the left brake operator 35 activates the rear brake, the present invention is not limited thereto.

Alternatively, the operation of the right brake operator may activate the left brake and the right brake and an operation of a foot brake operator may activate the rear brake.

Alternatively, the operation of the right brake operator may activate the right brake, while the operation of the left brake operator may activate the left brake, and the operation of the foot brake operator may activate the rear brake.

Alternatively, the operation of the right brake operator may activate the rear brake, while the operation of the left brake operator may activate the left brake and the right brake.

Alternatively, the operation of the right brake operator may activate the right brake and the left brake, while the operation of the left brake operator may activate the rear brake, the right brake and the left brake.

In the preferred embodiments described above, although the vehicle 1 is described as preferably including the parallelogram linkage 5, the present invention is not limited thereto. Preferred embodiments of the present invention may include a vehicle including a linkage of a wishbone type, a leading arm type and the like. Preferred embodiments may include a vehicle not including a linkage which includes two front wheels aligned side by side in the left-and-right direction and in which the two front wheels are connected together by a tie rod.

In the preferred embodiments described above, the vehicle 1 is described as preferably including the bar-like handlebar 651 which extends in a straight line in the left-and-right direction of the body frame 21. However, the present invention is not limited thereto. Preferred embodiments of the present invention may include a vehicle including a handlebar including grips at left and right ends, and including a handlebar which extends while being bent from a central portion so that left and right ends are disposed in a raised position.

In the preferred embodiments described above, although the left shock absorber 61 is preferably positioned on the left side of the left front wheel 31 and the right shock absorber 62 is preferably positioned on the right side of the right front wheel 32, the present invention is not limited thereto. The left shock absorber 61 may be positioned on the right of the left front wheel 31, and the right shock absorber 62 may be positioned on the left of the right front wheel 32. The left shock absorber 61 and the right shock absorber 62 may be a telescopic shock absorber or may be a shock absorber of a bottom link type, a trailing arm type or the like, or the left shock absorber 61 and the right shock absorber 62 may not be included.

In the preferred embodiments described above, the vehicle 1 preferably includes a single rear wheel 4. However, the vehicle 1 may include a plurality of rear wheels.

In the preferred embodiments described above, the center of the rear wheel 4 in the left-and-right direction of the body frame 21 preferably coincides with the center of the space defined between the left front wheel 31 and the right front wheel 32 in the left-and-right direction of the body frame 21. Although the configuration described above is preferable, the center of the rear wheel 4 in the left-and-right direction of the body frame 21 does not have to coincide with the center of the space defined between the left front wheel 31 and the right front wheel 32 in the left-and-right direction of the body frame 21.

In alternative preferred embodiments of the present invention, the linkage 5 may include a cross member other than the upper cross member 51 and the lower cross member 52. The "upper cross member" and the "lower cross member" are merely designated as such based on their relative positional relationship in the up-and-down direction. The upper cross member does not necessarily mean an uppermost cross member in the linkage 5. The upper cross member refers to a cross member which lies above another cross member. The lower cross member does not necessarily mean a lowermost cross member in the linkage 5. The lower cross member refers to a cross member which lies below another cross member.

In the preferred embodiments described above, the upper cross member 51 is preferably a single plate-shaped member, while the lower cross member 52 includes the front element 521 and the rear element 522. However, the upper cross member 51 may include a front element and a rear element. Additionally, the lower cross member 52 may include a single plate-shaped member. Alternatively, at least one of the upper cross member 51 and the lower cross member 52 may include a left plate-shaped member which is supported on the headpipe 211 and the left side member 53 and a right plate-shaped member which is supported on the headpipe 211 and the right side member 54.

In the preferred embodiments described above, the linkage 5 is preferably supported on the headpipe 211. However, the linkage 5 may be supported on a portion of the body frame 21 other than the headpipe 211.

In the preferred embodiments described above, the steering force transmission 6 preferably includes the pitman arm 663, the left transmission plate 664, the right transmission plate 665, the intermediate joint 666, the left joint 667, the right joint 668, and the tie rod 669. However, as long as the steering force from the handlebar 651 is able to be transmitted to the left front wheel 31 and the right front wheel 32 by the tie rod 669, the pitman arm 663, the left transmission plate 664, the right transmission plate 665, the intermediate joint 666, the left joint 667 and the right joint 668 may be replaced by appropriate joints such as universal joints.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A vehicle comprising:
  a body frame;

a right front wheel and a left front wheel aligned side by side in a left-and-right direction of the body frame;
a right brake that applies a brake force to the right front wheel;
a left brake that applies a brake force to the left front wheel;
a brake operator that operates at least one of the right brake and the left brake;
a grip that a rider grips; and
a steering force transmission that transmits a steering force from the grip to the right front wheel and the left front wheel, the steering force transmission including:
   a steering shaft that turns about an intermediate turning axis which extends in an up-and-down direction of the body frame;
   a handlebar located at an upper portion of the steering shaft and the grip is located on at least one end of the handlebar; and
   a tie rod that transmits a turning motion of the steering shaft to the right front wheel and the left front wheel; wherein
a rubber damper that suppresses the transmission of vibration, which is due to a difference between a frictional force that is generated between the right front wheel and a corresponding road surface and a frictional force that is generated between the left front wheel and a corresponding road surface, to the grip is provided in the steering force transmission.

2. The vehicle according to claim 1, further comprising:
a right shock absorber that supports the right front wheel at a lower portion of the right shock absorber such that the right front wheel is rotatable and is displaceable relative to an upper portion of the right shock absorber; and
a left shock absorber that supports the left front wheel at a lower portion of the left shock absorber such that the left front wheel is rotatable and is displaceable relative to an upper portion of the left shock absorber.

3. The vehicle according to claim 1, further comprising a linkage that includes a cross member which is supported on the body frame, turns about a link axis that extends in a front-and-rear direction of the body frame, and supports the right front wheel and the left front wheel such that the right front wheel and the left front wheel are displaced relative to the body frame in the up-and-down direction of the body frame which causes the body frame to lean to the right of the vehicle when the vehicle turns right and to lean to the left of the vehicle when the vehicle turns left.

4. The vehicle according to claim 3, wherein the linkage further includes:
a right side member that turns about a right axis, which extends in the front-and-rear direction of the body frame at a right side of the cross member, and that supports the right front wheel such that the right front wheel turns about a right turning axis, which extends in the up-and-down direction of the body frame; and
a left side member that turns about a left axis, which is parallel or substantially parallel to the right axis at a left side of the cross member, and that supports the left front wheel such that the left front wheel turns about a left turning axis, which is parallel or substantially parallel to the right turning axis.

5. The vehicle according to claim 1, wherein
the steering force transmission further includes a pitman arm that is fixed to the steering shaft at one end and that is connected to the tie rod at another end such that the pitman arm turns relative to the tie rod; and
the rubber damper is located between the tie rod and the pitman arm such that a steering force applied to the grip is transmitted from the pitman arm to the tie rod via the rubber damper.

6. The vehicle according to claim 1, wherein
the body frame includes a headpipe;
the steering shaft is inserted in the headpipe; and
the rubber damper is located between the headpipe and the steering shaft.

7. The vehicle according to claim 1, wherein
the rubber damper is located between the handlebar and the steering shaft; and
a steering force applied to the grip is transmitted from the handlebar to the steering shaft via the rubber damper.

8. The vehicle according to claim 1, wherein the rubber damper includes:
a metallic annular or tubular outer member;
a metallic inner member that is located inside the outer member; and
a rubber portion that is connected to the outer member and the inner member and that fills at least a portion of a space between the outer member and the inner member; wherein
the inner member and the outer member are displaced relative to each other by elastic deformation of the rubber portion.

9. The vehicle according to claim 8, wherein the inner member and the outer member extend in the up-and-down direction of the body frame.

10. The vehicle according to claim 9, wherein the outer member and the inner member are displaced relative to each other in a front-and-rear direction of the body frame by elastic deformation of the rubber portion.

11. The vehicle according to claim 9, wherein the outer member and the inner member are displaced relative to each other in the front-and-rear direction of the body frame and in the left-and-right direction of the body frame by elastic deformation of the rubber portion.

12. The vehicle according to claim 8, further comprising:
a right shock absorber that supports the right front wheel such that the right front wheel is displaceable relative to an upper portion of the right shock absorber in a direction of a right extending and contracting axis that extends in the up-and-down direction of the body frame; and
a left shock absorber that supports the left front wheel such that the left front wheel is displaceable relative to an upper portion of the left shock absorber in a direction of a left extending and contracting axis that is parallel or substantially parallel to the right extending and contracting axis; wherein
the inner member and the outer member are displaced relative to each other about an axis that is parallel or substantially parallel to the right extending and contracting axis by elastic deformation of the rubber portion.

* * * * *